United States Patent [19]

Nomura et al.

[11] Patent Number: 4,907,274

[45] Date of Patent: Mar. 6, 1990

[54] INTELLIGENT WORK STATION

[75] Inventors: Norimasa Nomura, Yokohama; Kazuhiro Mori, Tokyo, both of Japan

[73] Assignee: Kabushiki Kashia Toshiba, Kawasaki, Japan

[21] Appl. No.: 167,256

[22] Filed: Mar. 11, 1988

[30] Foreign Application Priority Data

Mar. 13, 1987 [JP] Japan .................. 62-56738

[51] Int. Cl.[4] .................. G01L 5/06; H04L 9/02; H04M 1/64; H04M 11/08
[52] U.S. Cl. .................. 380/30; 364/513.5; 379/88; 379/100; 381/43
[58] Field of Search ............... 364/513.5; 379/88, 100; 380/30, 18; 381/43, 46

[56] References Cited

U.S. PATENT DOCUMENTS

| 4,731,841 | 3/1988 | Rosen et al. | 380/23 |
| 4,785,408 | 11/1988 | Britton et al. | 364/513.5 |
| 4,799,258 | 1/1989 | Davies | 380/21 |

FOREIGN PATENT DOCUMENTS

| 0119164 | 6/1985 | Japan | 379/100 |
| 0120645 | 6/1985 | Japan | 379/100 |
| 0233972 | 11/1985 | Japan | 379/88 |
| 0146047 | 7/1986 | Japan | 379/355 |

OTHER PUBLICATIONS

"Communications Privacy: Integration of Public and Secret Key Cryptography", J. Kowalchuk et al., IEEE 1980 National Telecommunications Conference (Record), Houston, TX, 30 Nov-4 Dec. 1980, pp. 49.1.1–49.1.5.

Primary Examiner—Thomas W. Brown
Attorney, Agent, or Firm—Oblon, Spivak, McClelland, Maier & Neustadt

[57] ABSTRACT

In an intelligent work station of this invention, map information for a target is stored in a database. Word speech data input through a telephone line is recognized and analyzed, and the database is retrieved accordingly, so that map information specified by the speech input is extracted from the database. The map information is transmitted to a destination communication terminal. When the destination communication terminal does not have an image output function, the map information is analyzed, and document data representing the content of the map is created. The document data is speech-synthesized, and is output to the destination communication terminal via the telephone line.

34 Claims, 39 Drawing Sheets

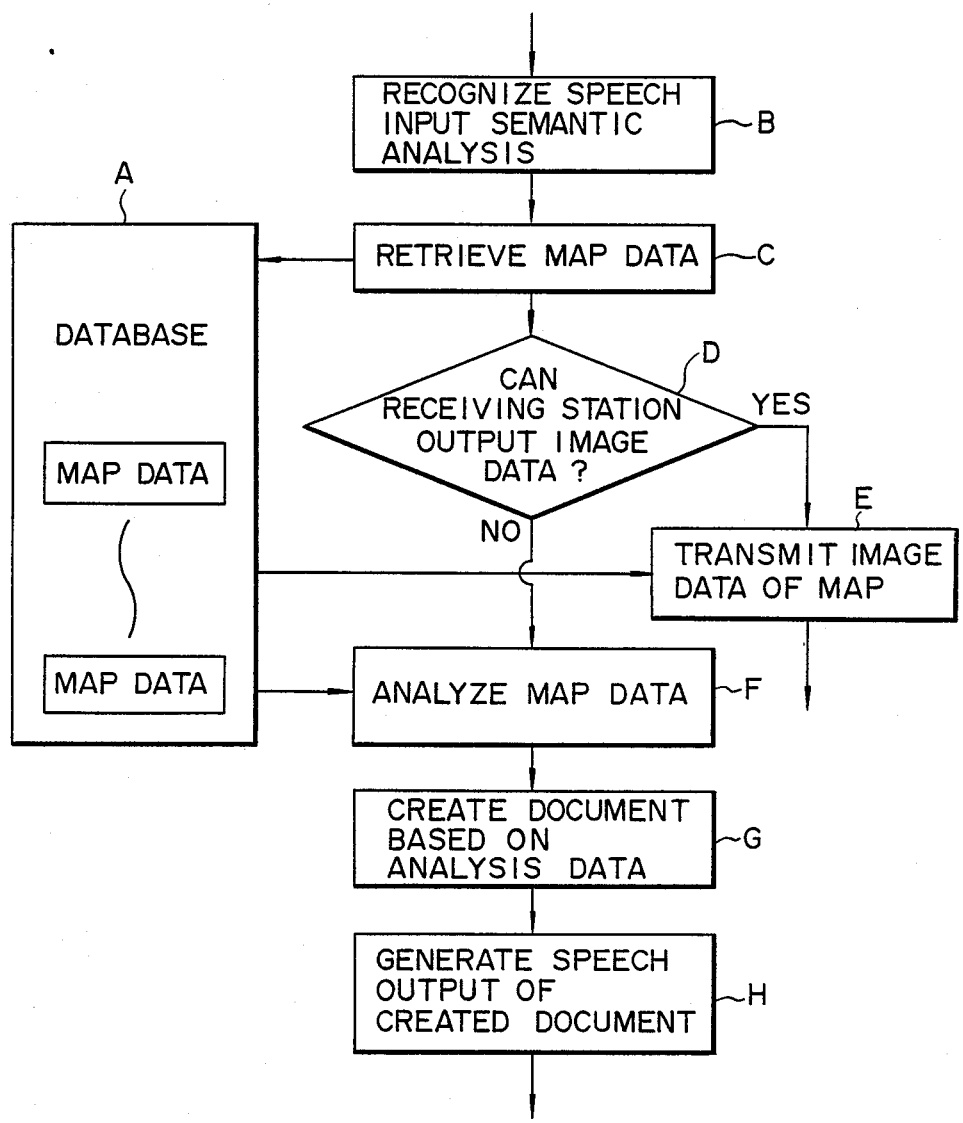
F I G. 1

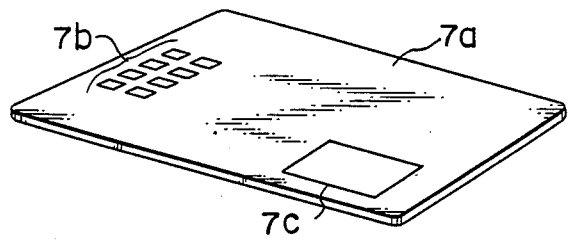
F I G. 3
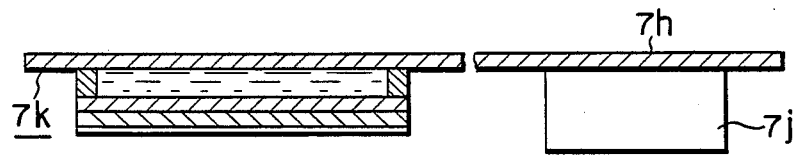
F I G. 5
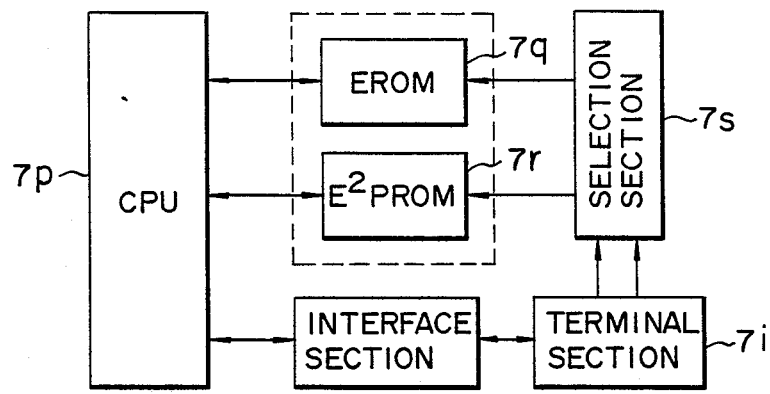
F I G. 6

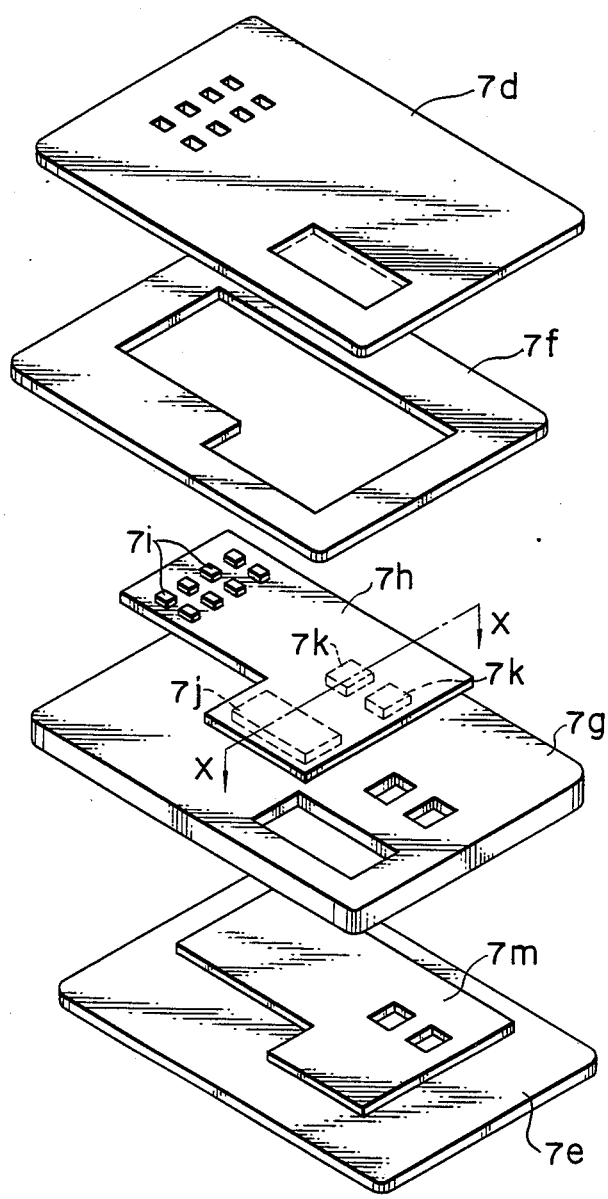
F I G. 4

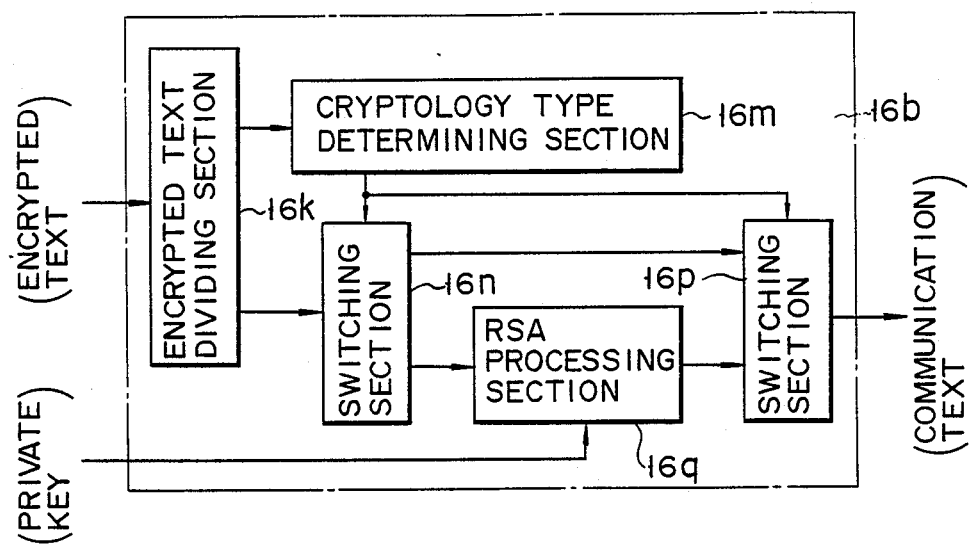
F I G. 10
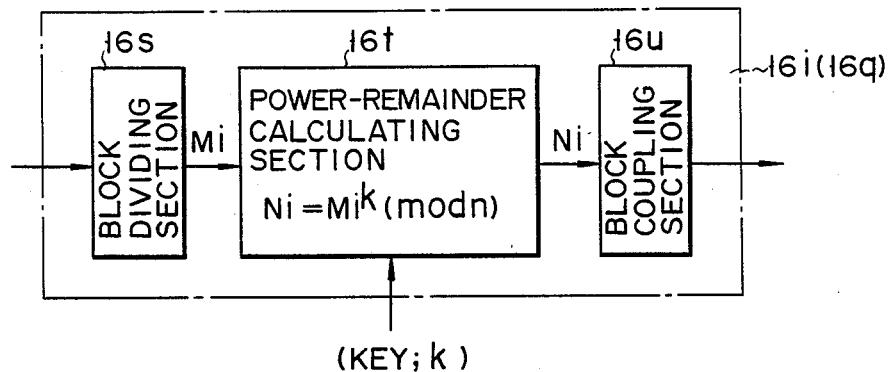
F I G. 11

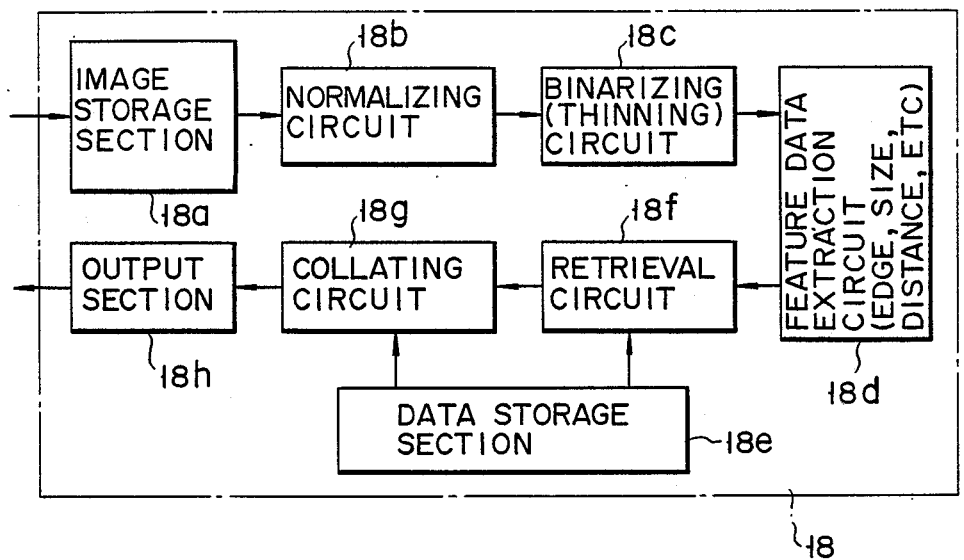
F I G. 12
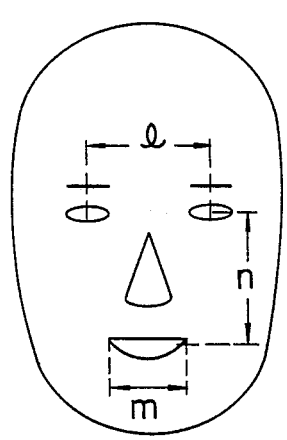 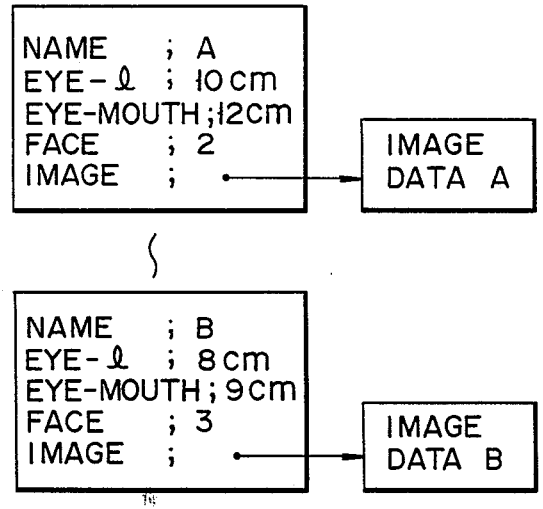
F I G. 13　　F I G. 14

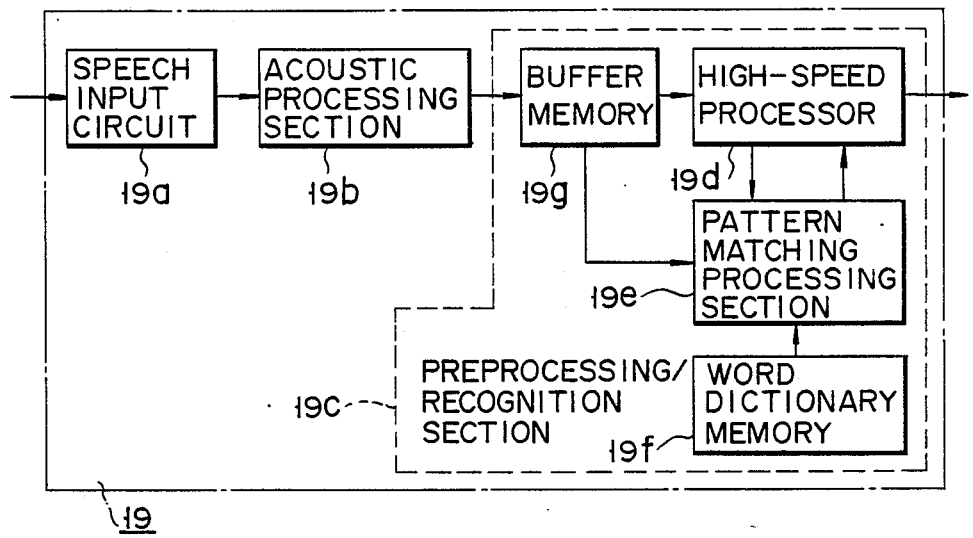
F I G. 15
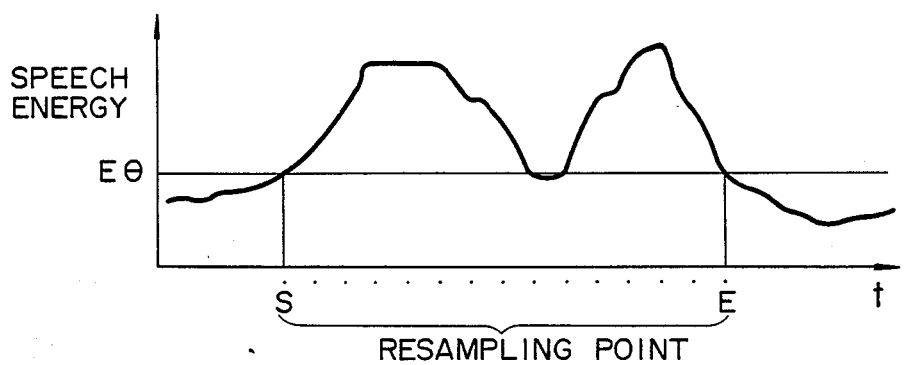
F I G. 16
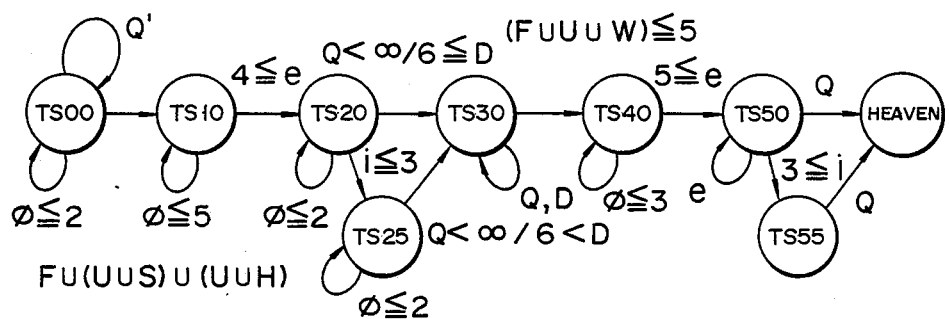
F I G. 18

| SYMBOL | ACOUSTIC FEATURE | OUTPUT CHARACTERISTICS OF GLOSS FILTER 1 2 3 4 (ch) |
|---|---|---|
| Q | SILENCE | $E < E\theta$ |
| U | UNVOICED | |
| F | FRICATIVE | |
| W | FRICATIVE | |
| B | BUZZ | |
| G | MUTE | |
| N | NASAL | |
| S | RESONANCE | |
| H | RESONANCE | |
| M | RESONANCE | |
| D | ENERGY DIP | |
| V | VOICED | ( U u F u W ) |

F I G. 17

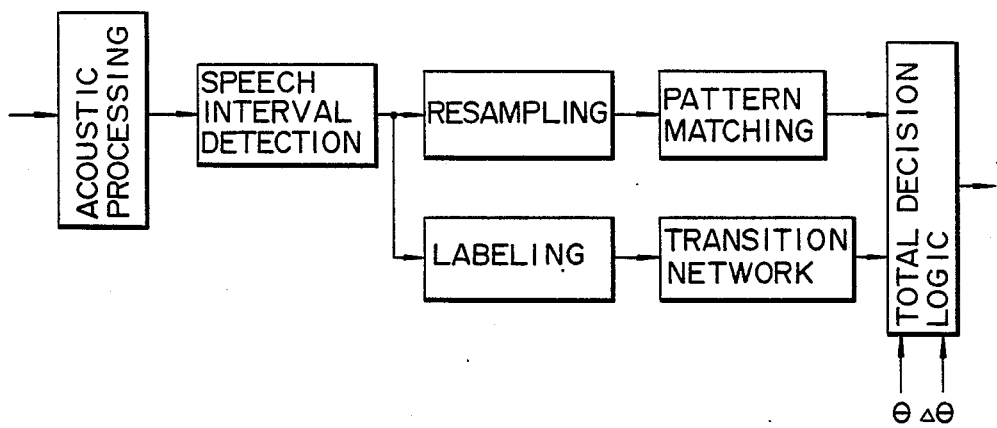
F I G. 19
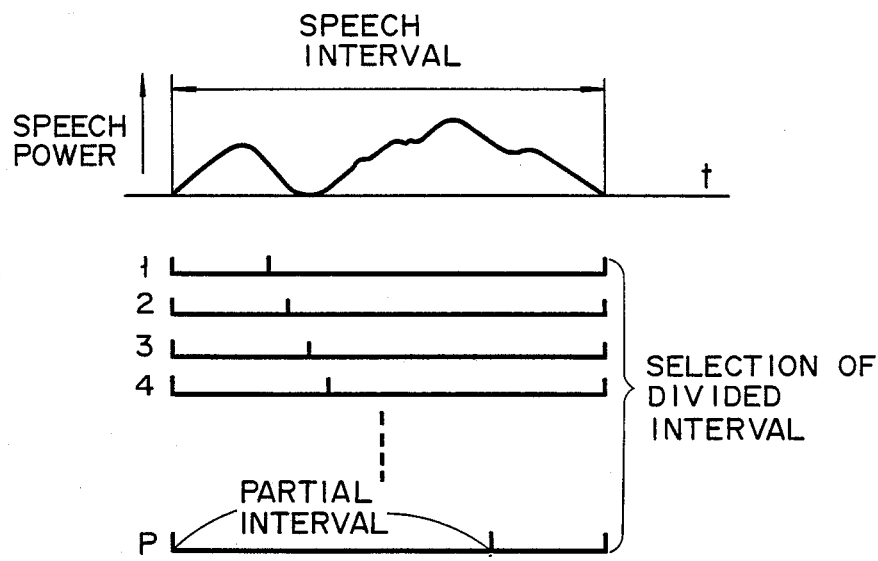
F I G. 20

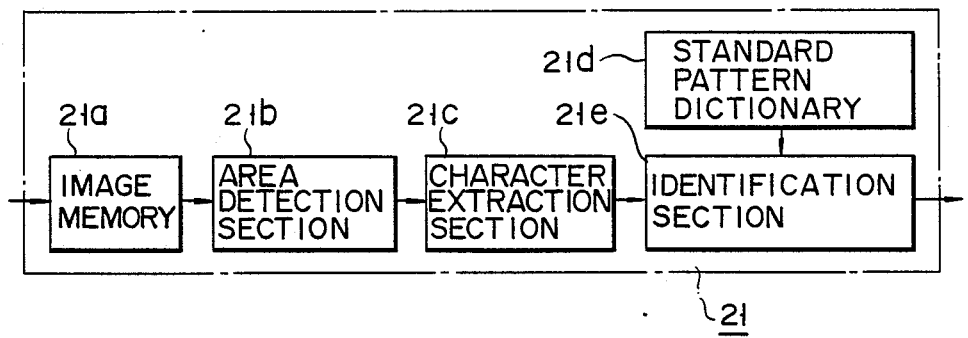
F I G. 22
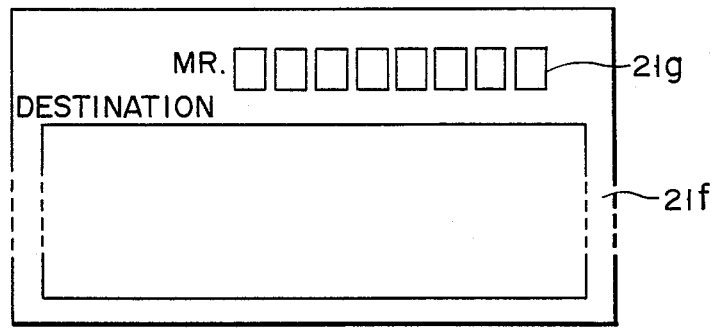
F I G. 23
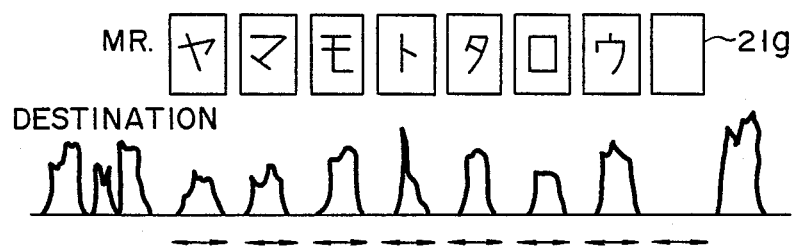
F I G. 24

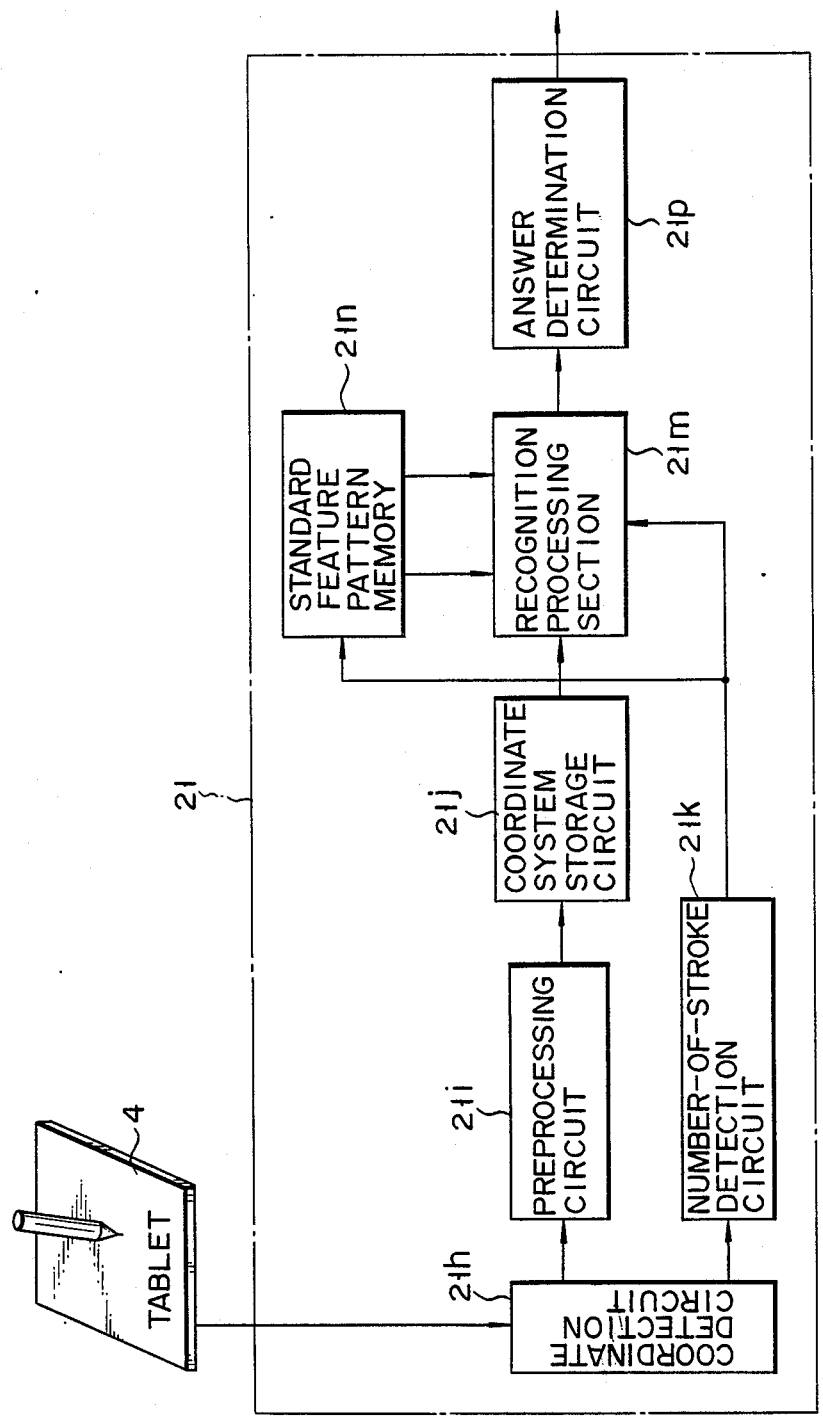
F I G. 25

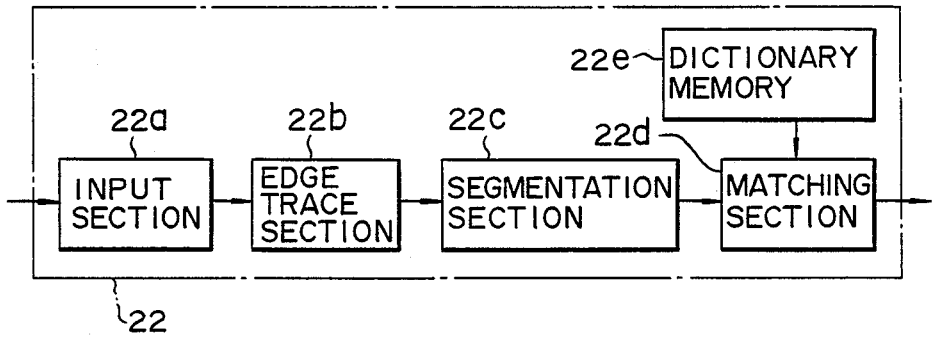
F I G. 26
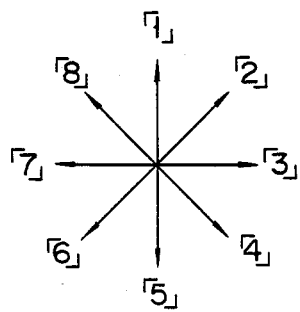
F I G. 27
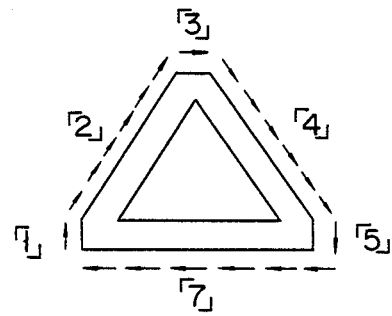
F I G. 28
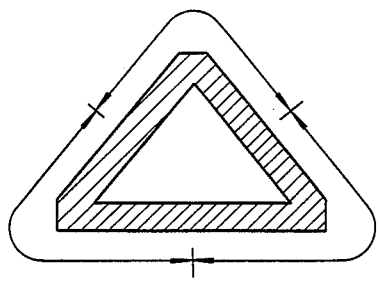
F I G. 29
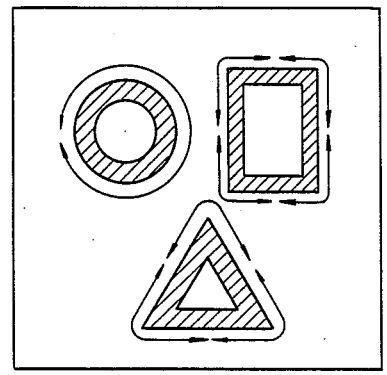
F I G. 30

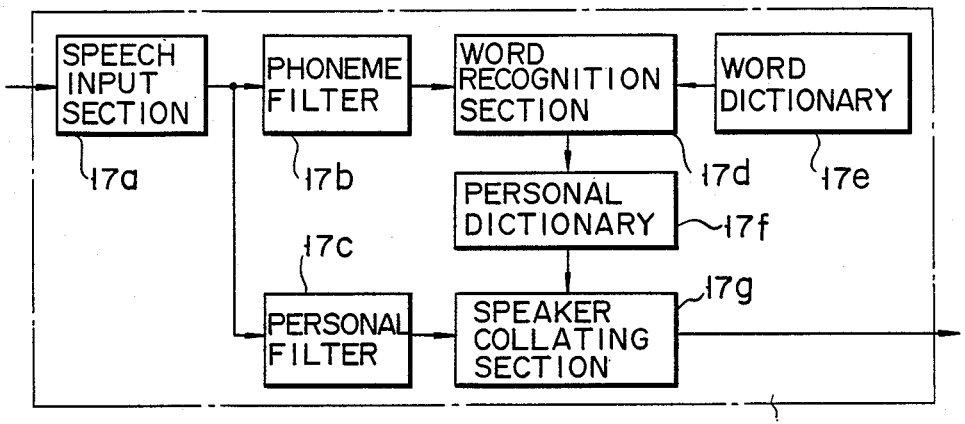
F I G. 35
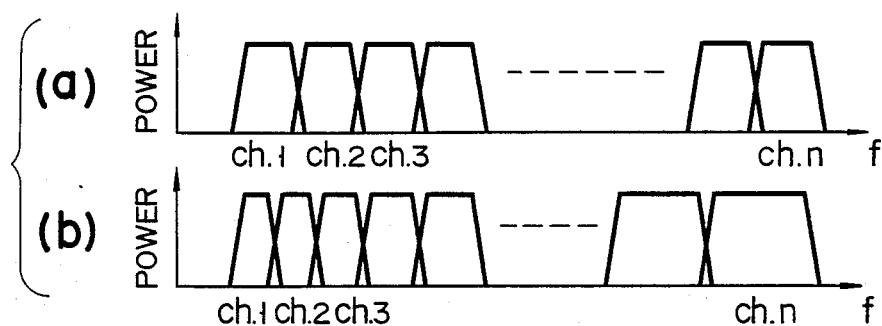
F I G. 36
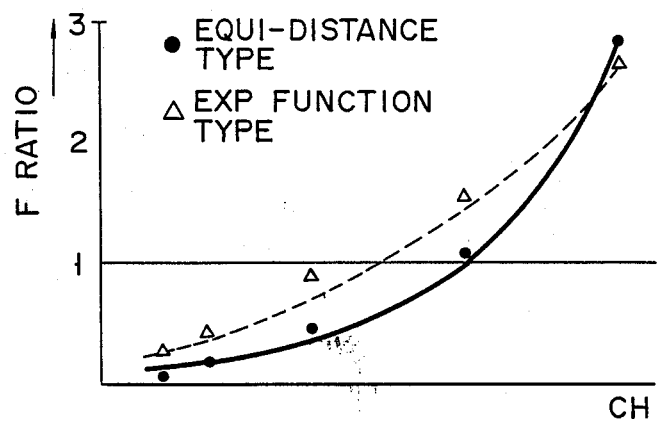
F I G. 37

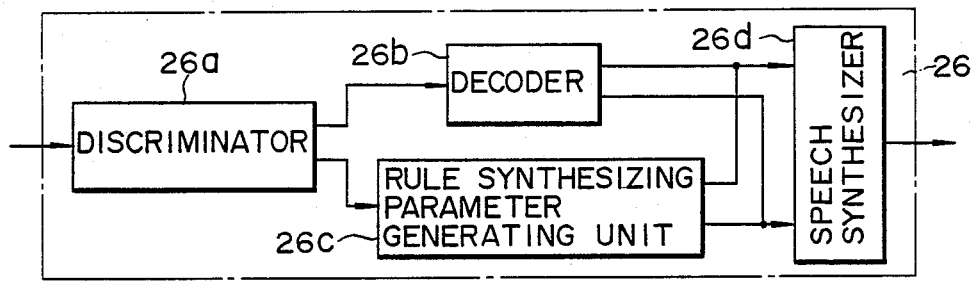
FIG. 38
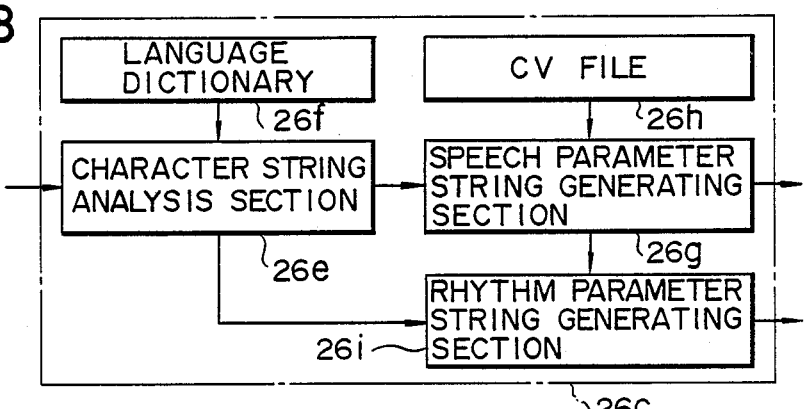
FIG. 39
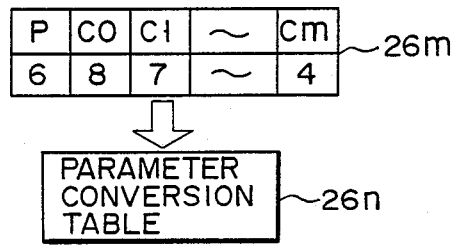
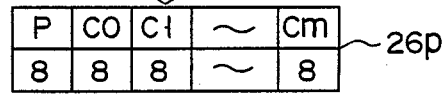
FIG. 40
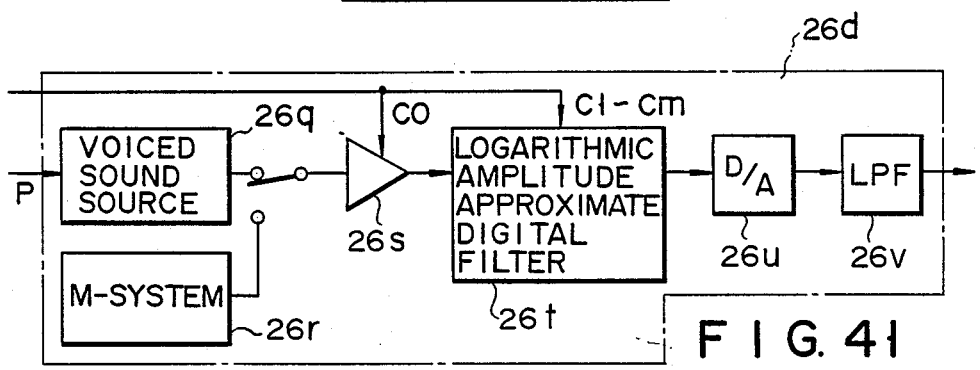
FIG. 41

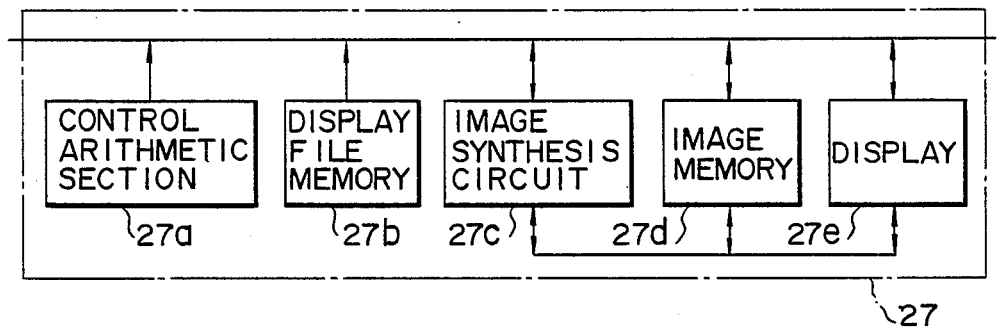
F I G. 42
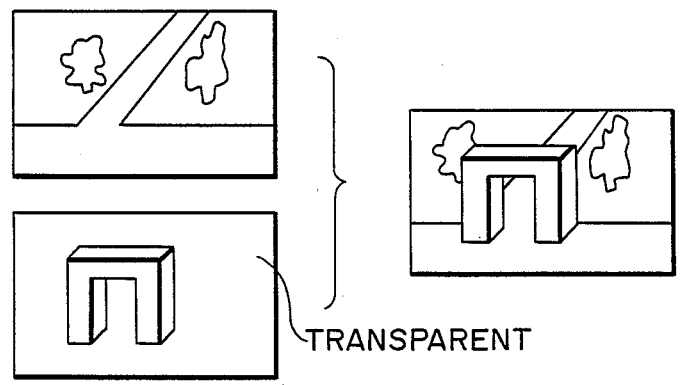
F I G. 43
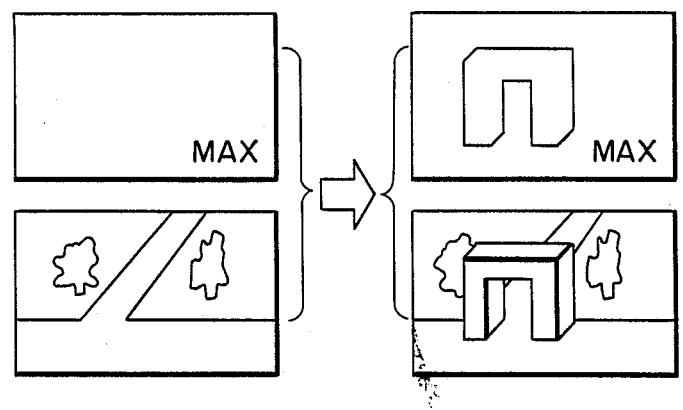
F I G. 44

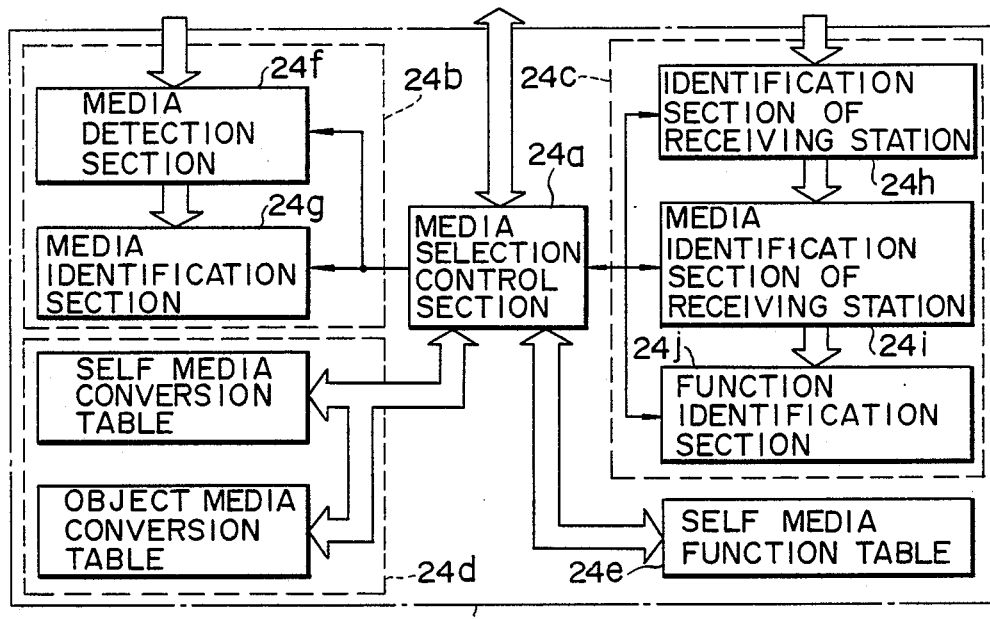
F I G. 45
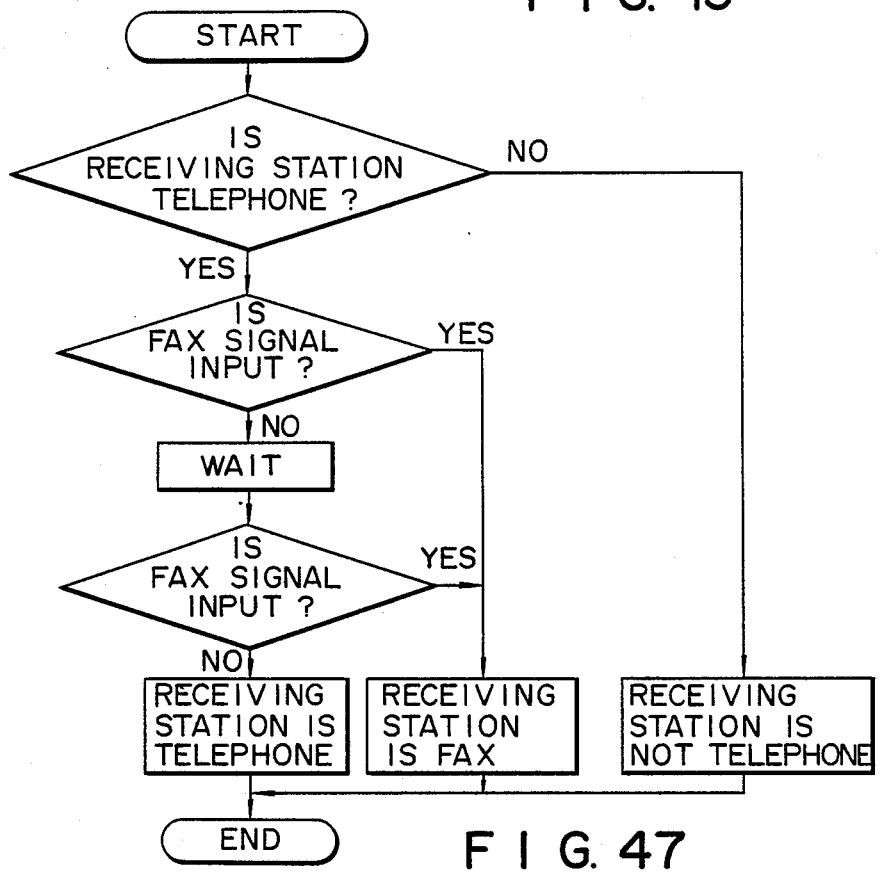
F I G. 47

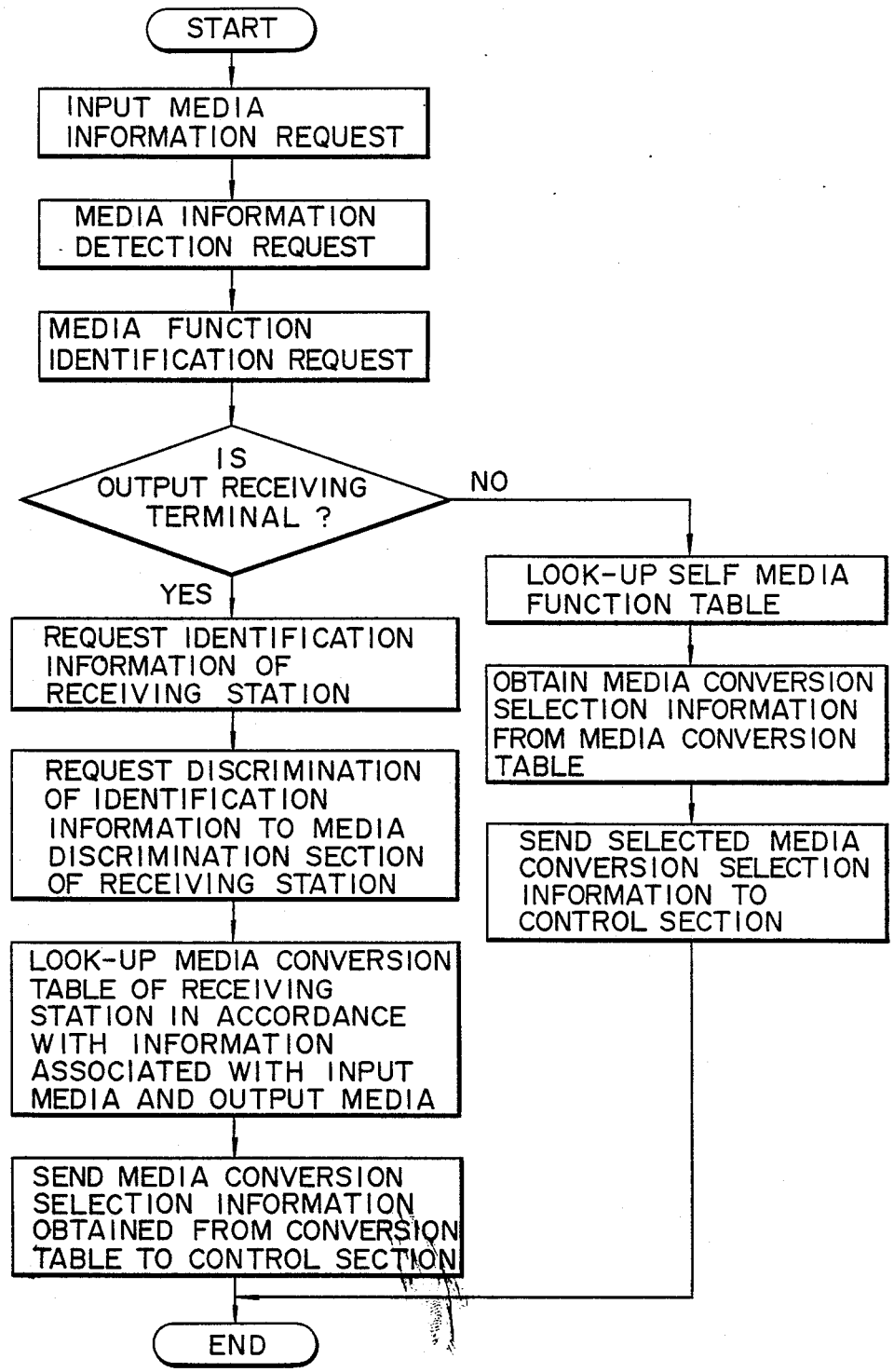
F I G. 46

FIG. 48

| INPUT MEDIA | SPEECH | SPEECH | CODE CHARACTER | MULTI-MEDIA | SPEECH |
|---|---|---|---|---|---|
| INPUT FUNCTION | ADPCM | ADPCM | FUNDAMENTAL CLASS (CLASS OF VIRTUAL TERMINAL) | MIX MODE CLASS (CLASS OF VIRTUAL TERMINAL) | log PCM |
| RECEIVING STATION | FAX | FAX | TELEPHONE | WORK STATION | WORK STATION |
| MEDIA OF RECEIVING STATION | IMAGE | IMAGE | SPEECH | IMAGE | MIX MODE (SPEECH, IMAGE, CHARACTER) |
| FUNCTION OF RECEIVING STATION | GIII | GIV | log PCM | GIII | SPEECH;ADPCM IMAGE ---- |
| MAJOR CONVERSION SELECTION | SPEECH→CODE CHARACTER→IMAGE | CODE SPEECH→CHARACTER | CHARACTER CODE →SPEECH | CHARACTER→IMAGE CODE | SPEECH→SPEECH |
| MAJOR CONVERSION FUNCTION | ADPCM→GIII | ADPCM→2-BYTE CODE | 2-BYTE CODE→log PCM | MIX MODE→GIII | log PCM →ADPCM |
| SLAVE CONVERSION MEDIA | — | SPEECH(ADPCM)→CODE CHARACTER CODE CHARACTER→IMAGE | — | — | — |
| SLAVE CONVERSION FUNCTION | — | ADPCM→2-BYTE CODE | — | — | — |

(a) | NAME | ADDRESS | TELEPHONE NUMBER | IMPORTANCE |  RELATION NAME: ADDRESS BOOK (b) | JOB | AGENT 1 | AGENT 2 | AGENT 3 |  RELATION NAME: PERSONAL JOB & ITS AGENT (c) | COMMAND | NUMBER OF TIME |  RELATION NAME: OPERATION HISTORY (d) | EMPLOYEE NUMBER | NAME | DEPARTMENT | TITLE | PERSONAL LEVEL | PRESENCE/ABSENCE OF OHP | WORK PLACE | WS NUMBER | TELEPHONE NUMBER |  RELATION NAME: PERSONNEL (e) | NAME OF MEETING ROOM | PLACE | CAPACITY | PRESENCE/ABSENCE OF OHP |  RELATION NAME: MEETING ROOM (f) | NAME OF MEETING ROOM | START TIME | END TIME | NAME OF MEETING |  RELATION NAME: MEETING ROOM RESERVATION (g) | NAME OF MEETING | LEVEL | REPRESENTATIVE | PLACE | START TIME | END TIME | ATTENDANT | REFERENCE |  RELATION NAME: MEETING

F I G. 51

| SYSTEM A | SYSTEM B | SYSTEM C | SYSTEM D | ---- |
|---|---|---|---|---|
| DELETE | DEL | ERASE | REMOVE | ---- |
| CATA | DIR | CLIST | CATLIST | ---- |
| CREATE | CRE | MAKEFL | NEWFILE | ---- |
| EDIT | ED | EDITFL | FILEED | ---- |
| COPY | COPY | COPY | FILECOPY | ---- |
| | | | | ---- |
F I G. 53
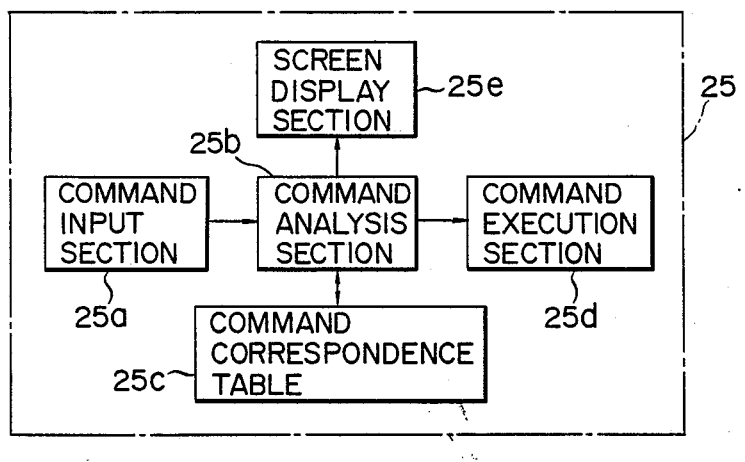
F I G. 54

| NAME OF USE FUNCTION | FREQUENCY OF USE | FINALLY USED DATE & TIME | SKILL CLASS STATED BY USER | PREVIOUSLY USED SKILL CLASS | LEVEL |
|---|---|---|---|---|---|
| EDITOR FUNDAMENTAL FUNCTION | 98 | 1983/12/15/07 | B | B | 1 |
| EDITOR HIGH-GRADE FUNCTION | --- | --- | A | A | 2 |
| FORTRAN COMPILER | --- | --- | A | A | 1 |
| JAPANESE TEXT PROCESSING SYSTEM FUNDAMENTAL FUNCTION | --- | --- | B | --- | --- |
| JAPANESE TEXT PROCESSING SYSTEM HIGH-GRADE FUNCTION | --- | --- | A | --- | --- |
| LISP INTERPRETER | --- | --- | A | --- | --- |
| LISP COMPILER | --- | --- | A | --- | --- |
| FILE | --- | --- | C | --- | --- |
| ELECTRONIC MAIL | --- | --- | B | --- | --- |
| ELECTRONIC FILE | --- | --- | --- | --- | --- |
| ōA calc | --- | --- | --- | --- | --- |
| DOCUMENT RETRIEVAL SYSTEM | --- | --- | --- | --- | --- |

F I G. 60

| | UPDATE SKILL CLASS | ADDITIONAL MESSAGE |
|---|---|---|
| 1 | A → B | *USE CONCISE MENU BECAUSE YOU HAVE LEARNED |
| 2 | B → C | *USE ADVANCED MENU BECAUSE YOU HAVE SKILLED |
| 3 | C → B | *USE INTERMEDIATE MENU BECAUSE YOU DID NOT USE THE SYSTEM RECENTLY |
| 4 | B → A | *USE BEGINNER'S MENU BECAUSE YOU DID NOT USE THE SYSTEM RECENTLY |

```
┌─────────────────────────────────────┐
│      ✶✶ CREATED DATA IS             │
│        STORED IN FILE ✶✶            │
├─────────────────────────────────────┤
│ INPUT NAME OF DATA INPUT            │
│ LOCATION                            │
│   FIRST, DEVICE NAME                │
│                                     │
│  DEVICE NAME [    ]                 │
│                                     │
│ NEXT, NAME OF ORDINARY USED         │
│ STORAGE DEVICE.                     │
│ FOR EXAMPLE, (DKOO)                 │
│ IF UNKNOWN, PRESS KEY (F15) OF      │
│ KEYBOARD TO DISPLAY CANDIDATES      │
│ OF USED DEVICE NAMES. SELECT        │
│ ONE.                                │
│─────────────────────────────────────│
│ ·DEVICE --- WORK       STORAGE DEVICE│
│             STATION    ┌──────┐FILE │
│                        │══════│     │
│ ·FILE --                │──────│SUB │
│                        └──────┘FILE │
│                         ┌────┐      │
│ ·SUB FILE --            └────┘      │
│                            ⋮        │
└─────────────────────────────────────┘

F I G. 63

┌─────────────────────────────────────────────┐
│ ✶✶ DON'T YOU KNOW INPUT PROCEDURE? WHEN YOU INPUT │
│    DKOO AT THE KEYBOARD, DKOO IS DISPLAYED IN THE │
│    DEVICE NAME COLUMN. IF YOU WANT TO CORRECT IT, │
│    PRESS "CORRECTION" KEY BEFORE INPUT, OR USE KEY│
│    (F15) FOR MORE CONVENIENCE.               │
└─────────────────────────────────────────────┘

F I G. 64
```

```
** CREATED DATA IS
   STORED IN FILE **
```

DEVICE NAME ☐

FILE NAME ☐

SUB FILE NAME ☐

VALID DATA ☐

DEVICE NAME IS REPRESENTED BY TWO LETTERS AND TWO NUMERALS LIKE (DK00)
WHEN SELECTED FROM USED DEVICE FILE NAME, PRESS KEY (F15) AND SELECT ONE.

F I G. 65

```
** WRONG DEVICE NAME IS INPUT, INPUT CORRECT DEVICE
   NAME.
```

F I G. 66

```
** STORAGE OF CREATED DATA **
```

| DEVICE NAME | FILE NAME | SUB FILE NAME | VALID DATE |
|---|---|---|---|
|  |  |  |  |

WHEN USE DEFAULT VALUE, PRESET DATA USING KEY (F14). PRESET DATA WILL BE AUTOMATICALLY STORED AFTER THIS. THIS FUNCTION IS CONVENIENT.

USE DATA OF YOUR SUB FILE IS AS FOLLOWS. FILE WILL OVERFLOW AFTER USE OF ⋯%.

| SUB FILE NAME | |
|---|---|
|  |  |

FIG. 67

```
** FILE NAME INPUT ERROR
```

FIG. 68

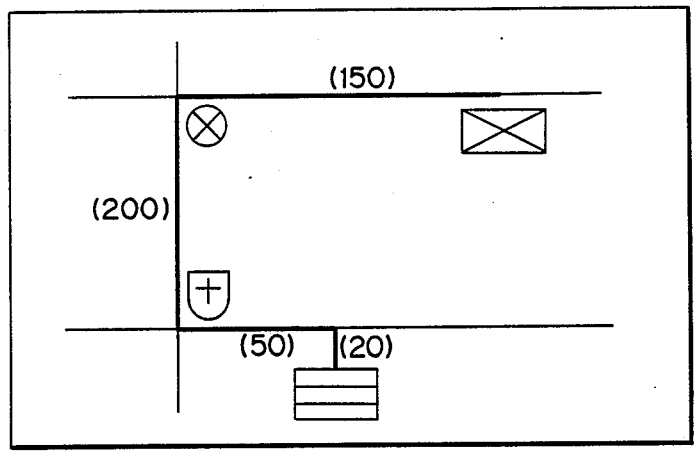
F I G. 70
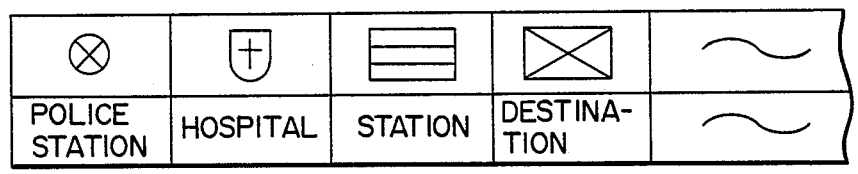
F I G. 71
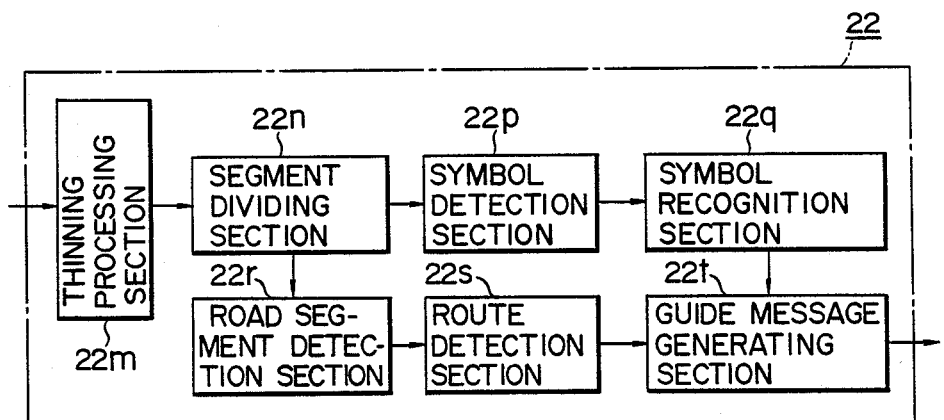
F I G. 72

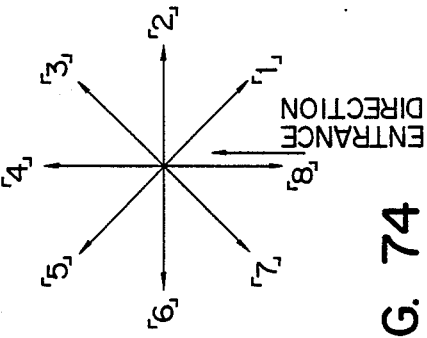
FIG. 74
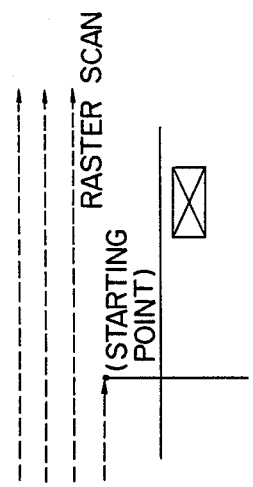
FIG. 73
| SEGMENT NUMBER | COORDINATES OF STARTING POINT | COORDINATES OF END POINT | LENGTH | LINE WIDTH | NUMBER OF CORNERS | LINK INFORMATION | FLAG | OTHERS |
|---|---|---|---|---|---|---|---|---|
| | | | | | | | | |
| | | | | | | | | |
| | | | | | | | | |
FIG. 75

INTELLIGENT WORK STATION

BACKGROUND OF THE INVENTION

1. Field of the Invention

The present invention relates to an intelligent work station which can effectively cope with an inquiry received by means of a telephone speech input.

2. Description of the Related Art

Recently, a transfer collation service of banks utilizing a telephone is receiving a lot of attention. In this service function, numerical information indicating an ID number and the like which is speech-input from an arbitrary telephone terminal through a telephone line is recognized, information (numerals, words, or phrases) stored in an information storage (database) is retrieved and extracted based on the recognition result, and the extracted information is speech-output through the telephone line. More specifically, necessary information is retrieved in accordance with speech information input from a telephone, and the retrieved information is speech-responded through the telephone.

Due to a tendency toward use of a variety of information in the contemporary society, the number of kinds of information inquiries using a telephone is increasing. For example, it is proposed to process not only an inquiry of numerical data for an interbank transfer mentioned above but also an inquiry of a route from a nearest station to a destination.

When an inquiry of a route is to be processed, it is preferable that a response is obtained in a graphic form such as a guide map.

In a conventional work station, pieces of route information for various targets are stored in a database as graphic (image) data of guide maps, and a response is made to an inquiry by outputting a guide map image using an image communication means such as a facsimile (FAX).

However, an inquiry using a telephone is not always made from a telephone terminal comprising a FAX function. Inquiries are often made from public telephones having no FAX function. In this case, since a guide map image cannot be output, a document guiding the route must be output as speech data. Guidances representing contents of guide maps can thus be registered in the database as well as the graphic (image) data of the guide maps, and these document and graphic data can be selectively output in accordance with the type of a telephone terminal from which the inquiry is made.

In order to realize such an inquiry response, since the database must store not only graphic (image) data representing the guide maps but also their guidances, a memory capacity required for the database becomes extremely large. In addition, management of the information is much complicated.

Furthermore, since guidances representing routes must be created in advance in correspondence with the guide maps, the document creation process requires much labor.

In a conventional work station, when various inquiries by a telephone are to be processed, the memory capacity of a database for storing response information is much increased, and much labor is required for creating guidances corresponding to guide maps.

SUMMARY OF THE INVENTION

An object of the present invention is to provide an intelligent work station which can reduce a memory capacity necessary for a database, can effectively respond to various inquiries through a telephone using information media corresponding to the type of the telephone terminal, and has great practical advantages.

To achieve the above object, according to the present invention an intelligent work station is provided comprising a database for storing at least map information; means for recognizing a word speech input through a telephone line and analyzing the recognition result; extraction means for retrieving said database in accordance with the analysis result from said analysis means and extracting map information indicated by the word speech input; detection means for detecting whether or not a communication terminal from which the word speech input is made through the telephone line has image output means; means for, when said detection means detects that the communication terminal has said image output means, transmitting, through the telephone line, image data of the map information extracted by said extraction means; document data creating means for, when said detection means detects that the communication terminal does not have said image output means, analyzing the map information extracted by said extraction means and creating document data representing a content of the map in accordance with the analysis result; and means for speech-synthesizing the document data created by said document data creating means and outputting the resultant data to the communication terminal through the telephone line.

According to the present invention, graphic information such as a guide map is retrieved from a database in response to an inquiry using a telephone. When the telephone terminal has an image data communication function, the graphic information is output as image data. When the telephone terminal does not have the image data communication function, the graphic information is analyzed, and document data representing the content of the graphic data is created. The document data is speech-synthesized and output.

Therefore, the database need only store graphic information such as a guide map, and a necessary memory capacity is not greatly increased. In other words, a necessary memory capacity of the database can be decreased, and the system configuration can be simplified.

A document, e.g., a route guidance, representing the content of graphic information is automatically created in accordance with the graphic information retrieved from the database, and the document data is speech-synthesized and output. Therefore, document data corresponding to graphic information need not be created in advance, and labor for creating documents can be greatly reduced. Document data necessary for speech response can only be created in accordance with graphic data retrieved from the database, as needed. Therefore, processing can be performed in correspondence with an inquiry request, and unnecessary labor for creating document data can be reduced. More specifically, only when a speech response is required for an inquiry, document data is created. Therefore, document data need not be created for all the graphic information stored in the database, and waste, e.g., creation of document data which is rarely utilized can be avoided.

BRIEF DESCRIPTION OF THE DRAWINGS

Other objects and features of the present invention will be apparent from the following description taken in connection with the accompanied drawings in which:

FIGS. 1 through 77 show an embodiment of the present invention, in which:

FIG. 1 is a flow chart showing characteristic processing functions of a work station according to the present invention;

FIG. 3 is a perspective view showing an outer appearance of an IC card incorporated in the work station;

FIG. 4 is an exploded perspective view showing the structure of the IC card;

FIG. 5 is a sectional view showing a structure of a printed board of the IC card;

FIG. 6 is a block diagram showing an arrangement of a semiconductor integrated circuit of the IC card;

FIG. 10 is a block diagram of a decrypting section;

FIG. 11 is a block diagram of an RSA processing section;

FIG. 12 is a block diagram showing an image collating section in the work station;

FIG. 13 is a view showing a face to be image-processed;

FIG. 14 is a view showing image data formats;

FIG. 15 is a block diagram showing an arrangement of a speech recognition section in the work station;

FIG. 16 is a graph showing an input speech pattern;

FIG. 17 is a table showing acoustic features of consonants;

FIG. 18 is a diagram showing a transition network;

FIG. 19 is a diagram showing speech recognition procedures;

FIG. 20 is a graph for explaining partial section detection in response to an input speech;

FIG. 22 is a block diagram showing an arrangement of a first character recognition block in a character recognition section in the work station;

FIG. 23 is a view showing an example of a FAX transmission original sheet on which characters to be recognized are written;

FIG. 24 is a view for explaining extraction processing of characters to be recognized;

FIG. 25 is a block diagram showing an arrangement of a second character recognition block in the character recognition section;

FIG. 26 is a block diagram showing an arrangement of a graphic recognition section in the work station;

FIGS. 27 through 30 are views for explaining graphic recognition processing;

FIG. 35 is a block diagram showing an arrangement of a speech collating section in the work station;

FIG. 36 is a graph showing examples of frequency-range division of a filter bank;

FIG. 37 is a graph showing filter characteristics;

FIG. 38 is a block diagram showing an arrangement of a speech synthesis section in the work station;

FIG. 39 is a block diagram showing a rule synthesizing parameter generating unit;

FIG. 40 is a view showing a speech parameter conversion structure;

FIG. 41 is a block diagram of a speech synthesizer;

FIG. 42 is a block diagram showing an arrangement of an image synthesis section in the work station;

FIGS. 43 and 44 are views showing the principle of image synthesis processing;

FIG. 45 is a block diagram showing an arrangement of an output format selection section in the work station;

FIG. 46 is a flow chart showing output format selection processing procedures;

FIG. 47 is a flow chart showing destination station identification processing procedures;

FIG. 48 is a media conversion table;

FIG. 51 is a view showing an example of a relation;

FIG. 53 is a command correspondence table;

FIG. 54 is a block diagram showing an arrangement of a work environment data acquisition section in the work station;

FIG. 60 is a skill table;

FIGS. 61 through 68 are views for explaining processing of the work environment data acquisition section; and FIGS. 69 through 77 are views for explaining an inquiry response function in the work station of the present invention, in which FIG. 69 is a flow chart showing inquiry response procedures, FIG. 70 is a view showing an example of a guide map retrieved and extracted from the database, FIG. 71 is a view showing meanings of symbols, FIG. 72 is a schematic block diagram of a processing function for analyzing a guide map and creating a guide message, and FIGS. 73 through 77 are views for explaining guide map analysis processing procedures.

DETAILED DESCRIPTION OF THE PREFERRED EMBODIMENTS

An embodiment of the present invention will be described with reference to the accompanying drawings.

Figure 2:
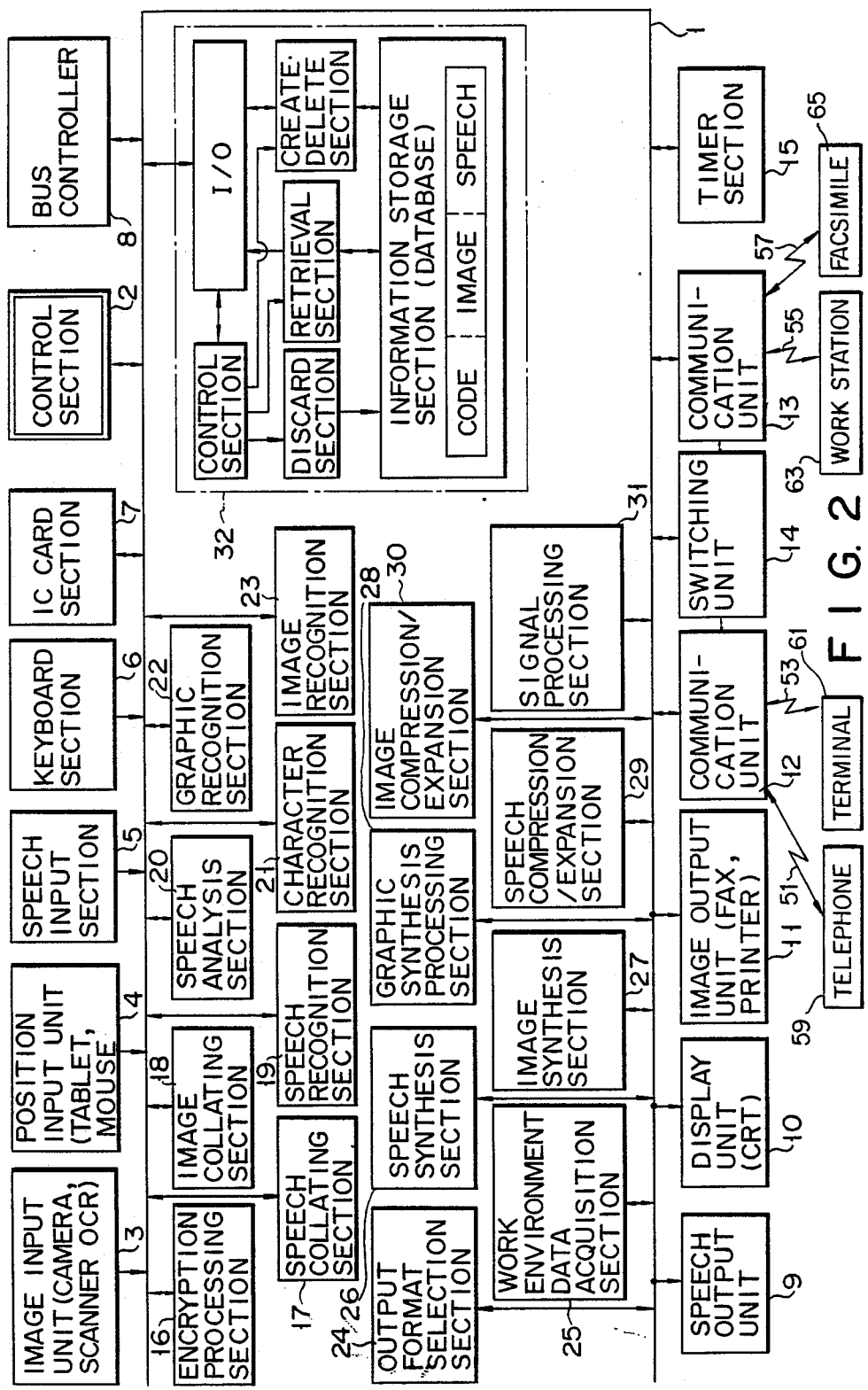
FIG. 2 is a schematic block diagram of the work station.

FIG. 2 shows an arrangement of an intelligent work station according to an embodiment of the present invention. The intelligent work station comprises the following sections:

Bus 1: it is used for performing necessary information transfer among the sections described below.

Control section 2: it comprises a microprocessor as a main component, and controls the operations of the respective sections of the intelligent work station.

Image input unit 3: it comprises a camera, a scanner, an OCR, and the like, and inputs various types of image information.

Coordinate position input unit 4: it comprises a tablet or a mouse, and inputs designated coordinate position information.

Speech input section 5: it comprises a microphone or the like, and inputs speech information.

Keyboard section 6: it comprises a plurality of keys, and is used for inputting character/symbol codes, control codes, and the like.

IC card section 7: it receives an IC card as will be described later, and exchanges necessary information with the IC card.

Bus controller 8: it controls information transfer through bus 1 among respective sections.

Speech output unit 9: it comprises a loudspeaker, and outputs speech information.

Display unit 10: it comprises a CRT display or a liquid crystal display, and displays characters, figures, images, and the like.

Image output unit 11: it comprises a FAX or a color printer, and prints out a variety of image information.

Communication units 12 and 13: communication unit 12 is connected to a telephone 59 and a terminal 61 through telephone lines 51 and 53, respectively to communicate with them. Further, communication unit 13 is connected to a work station 63 and a facsimile unit 65 through telephone lines 55 and 57, respectively to communicate with them.

Switching unit 14: it is used for switching a plurality of communication units.

Timer section 15: it provides time information or time interval information.

Encryption processing section 16: it performs encryption processing of various kinds of information.

Speech collating section 17: it collates whether or not given speech information is a specific speech input.

Speech recognition section 19: it recognizes given speech information.

Speech analysis section 20: it extracts a feature of speech input from speech input section 5 or the like, and analyzes the speech input.

Character recognition section 21: it recognizes character/symbol patterns input from image input unit 3, or the like.

Image recognition section 23: it recognizes a graphic image input from image input unit 3, or the like.

Output format selection section 24: it selects and controls a format of information output from the work station.

Work environment data acquisition section 25: it acquires information of a function state of the work station or a work environment in an office.

Speech synthesis section 26: it synthesizes speech inputs in accordance with processing data.

Image synthesis section 27: it synthesizes a plurality of pieces of image information, and executes image edit processing in accordance with processing data.

Graphic synthesis processing section 28: it synthesizes various types of graphic data and executes edit processing, e.g., inserts or deletes graphic data in accordance with processing data.

Speech compression/expansion section 29: it compresses (encodes) speech data or expands (decodes) compressed speech data.

Image compression/expansion section 30: it compresses (encodes) image data or expands (decodes) compressed image data.

Signal processing section 31: it executes a series of signal processing, e.g., compression, expansion, and addition of necessary information, of various kinds of signal information.

Database section 32: it classifies various kinds of information into a plurality of relations and stores them as a database. The database is constituted as not only code information but also image and speech information.

The work station according to the present invention basically comprises the above-mentioned sections, and provides intelligence functions by effectively utilizing the functions of the above-mentioned sections.

IC card section 7, encryption processing section 16, and the like, which are not as usual as keyboard section 5 and provide characteristic functions in this intelligent work station will be described below in more detail.

The IC card incorporates a semiconductor circuit such as a microprocessor, a memory circuit and the like, in card body 7a having a name-card size, as shown in FIG. 3. Interface section 7b connecting the intelligent work station body with the above arrangement, and display window section 7c are arranged at one end portion of the card.

Display window section 7c is formed by burying a transparent polarizer, and is disposed so as not to overlap interface section 7b and the semiconductor circuit. A portion of card body 7a corresponding to display window section 7c can be transparent, or the entire board can be transparent.

As shown in the exploded perspective view in FIG. 4, the IC card is constituted by integrally thermally compressing a pair of cover boards 7d and 7e, buried board 7f clamped between cover boards 7d and 7e, core sheet material 7g, and printed board 7h.

On printed board 7h, I/O terminals 7i are provided in a portion facing interface section 7b, and liquid crystal display unit 7j is provided at a position facing display window section 7c. Furthermore, semiconductor IC 7k is provided on printed board 7h. Metal foil 7m for dissipating heat from printed board 7h is provided to cover board 7e.

Note that hole portions are respectively formed in cover boards 7d and 7e, buried board 7f, and core sheet material 7g in correspondence with positions facing semiconductor IC 7j and the like integrated on printed board 7h. Cover boards 7d and 7e, buried board 7f, core sheet material 7g, and printed board 7h are stacked so that semiconductor IC 7k and the like are fitted in these hole portions, thus constituting the IC card. I/O terminals 7i are exposed through the hole portions formed in cover board 7d so as to constitute interface section 7b which is electrically connected to the work station body.

As shown in the sectional view of FIG. 5, liquid crystal display unit 7j is constituted as follows. A liquid crystal layer is clamped between a pair of polyether sulfone film substrates provided through a spacer, a transparent conductive film is formed on the inner surface of the film substrate, and a polarizer and a reflector are provided on the lower film substrate. When liquid crystal display unit 7j is constituted using the polyether sulfone film substrates as described above, its thickness can be easily reduced to 0.6 m or less. As compared to a case wherein a liquid crystal display device is constituted using glass substrates, the thickness of the IC card can be decreased.

A drive power source can be supplied from the work station body through interface section 7b but may be incorporated in the card. In this case, a sheet-like cell using a polymer film can be incorporated.

Semiconductor IC 7k comprises CPU 7p, PROM 7q, E²PROM 7r which serve as data memories, and selection section 7s for these memories, as shown in FIG. 6. PROM 7q is a nonprogrammable large-capacity nonvolatile memory, and stores a control program for CPU 7p, permanently recorded information, and the like. E²PROM 7r is a programmable small-capacity nonvolatile memory, and stores exchange numbers of information, numbers used in information exchange, and information to be updated when the numbers are used.

These memories are selectively driven under the control of selection section 7s, and exchanges information with CPU 7p. CPU 7p executes necessary information processing using these memories, and also exchanges information with the intelligent work station body from the interface section through terminals 7i.

IC card section 7 loads the IC card described above, and exchanges information with the IC card.

Note that the IC card is not limited to the above-mentioned arrangement, and IC card section 7 is arranged depending on IC cards.

Encryption processing section 16 will be described hereinafter.

Figure 7:
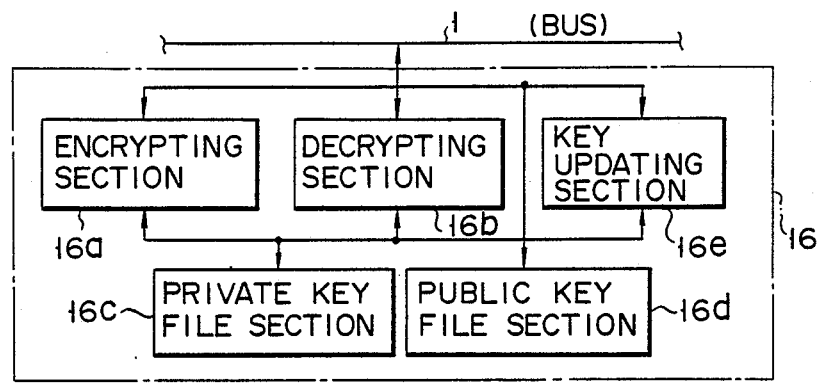
FIG. 7 is a block diagram showing an arrangement of an encryption processing section in the work station.

Encryption processing section 16 comprises encrypting section 16a, decrypting section 16b, private key file section 16c, public key file section 16d, and key updating section 16e, as shown in FIG. 7.

Figure 8:
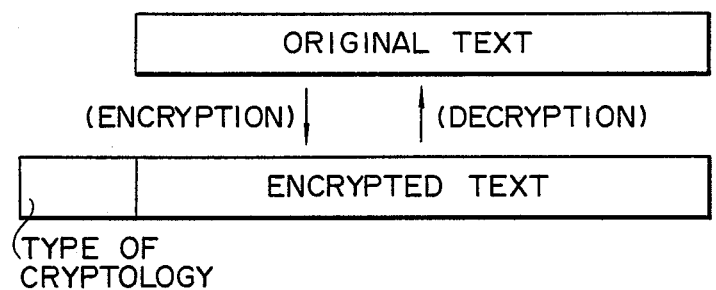
FIG. 8 is a view showing the principle of encryption/decryption.

FIG. 8 shows the principle of section 16. As shown in FIG. 8, a given original text is encrypted using an encryption key to generate an encrypted text, and the encrypted text is decrypted in accordance with the encryption key to obtain its original text.

Private key file section 16c and public key file section 16d store keys used for encryption and decryption, and key updating section 16e controls updating of the filed keys.

A private key is known by only a work station incorporating this encryption processing section 16, and is kept secret to other work stations. On the contrary, a public key is paired with a private key set in each work station, and is open to other work stations. Public key file section 16d stores such public keys in correspondence with the work stations.

Figure 9:
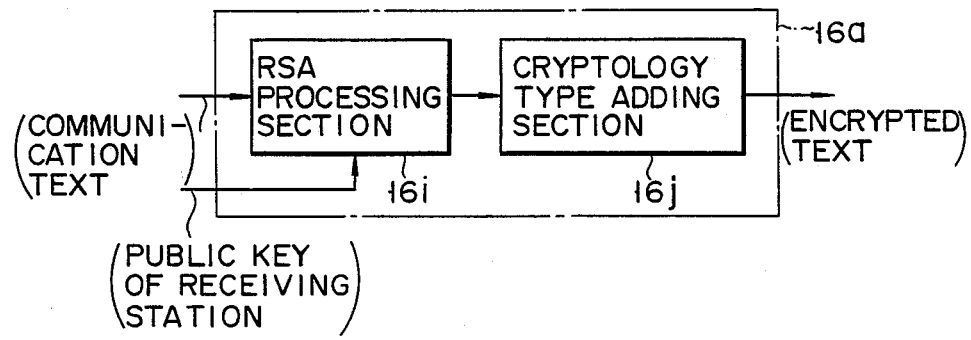
FIG. 9 is a block diagram of an encrypting section.

Encrypting section 16a comprises a conventional RSA (Rivest, Shamir, Adleman) processing section 16i and cryptology type adding section 16j, as shown in FIG. 9. When an original text is encrypted to perform information communication, section 16a encrypts the original text using a public key of a destination work station and adds information indicating a type of cryptology to the encrypted text to perform communication. Note that the information indicating the type of cryptology consists of information "0" indicating that a text is not ecrypted, "1" indicating that a text is encrypted, information indicating the encryption system, and the like.

Decrypting section 16b receives an encrypted text which is encrypted by a given work station using a public key thereof and is sent therefrom, and decrypts it using a private key corresponding to the public key. As shown in FIG. 10, section 16b comprises encrypted text dividing section 16k, cryptology type determining section 16m, switching sections 16n and 16p, and RSA processing section 16q.

Encrypted text dividing section 16k divides communication information which is sent in the above-mentioned format into cryptology type information and an encrypted text. Cryptology type determining section 16m determines based on the cryptology type information whether or not a communication text is encrypted. If the communication text is not encrypted, section 16m outputs the text through switching sections 16n and 16p. If the communication text is encrypted, section 16m supplies the text to RSA processing section 16q. RSA processing section 16q performs decryption processing of the encrypted text using the private key, and outputs the decrypted text through switching section 16p.

Each of RSA processing sections 16i and 16p comprises block dividing section 16s, power-remainder calculating section 16t, and block coupling section 16u, as shown in FIG. 11.

Block dividing section 16s divides a given signal train into blocks $M_i$ having a predetermined length. Power-remainder calculating section 16t calculates signal train $N_i$ represented by the following formula using encryption key k for each block $M_i$:

$$N_i = M_i^k \pmod{n}$$

where n is a constant. Signal train $N_i$ is sequentially coupled and output through block coupling section 16u.

In encryption processing, signal train $M_i$ is an original text, and an encrypted text is obtained as signal train $N_i$ from the original text. In decryption processing, signal train $M_i$ serves as an encrypted text, and an original text is obtained as signal train $N_i$ from the encrypted text.

Keys k for the encryption and decryption are public and private keys described above, and these keys are paired and set.

Therefore, each work station can encrypt communication information in accordance with public keys of other work stations. However, only a specific work station which knows a private key paired with the corresponding public key can decrypt the encrypted text.

Therefore, if a work station encrypts and transmits given information, it encrypts and transmits the original text in accordance with a public key of a destination work station. The communication information can be decrypted by the destination work station having the corresponding private key.

Note that all the public keys of other work stations need not be stored in public key file section 16d. For example, public keys of work stations may be filed in a separate public key file memory of the system in correspondence with the work stations. When information communication is required, a public key of the communication destination can be read out from the public key file memory and stored in public key file section 16d of the self work station.

The basic arrangement and functions of encryption processing section 16 have been described.

Image collating section 18 will be described below.

Image collating section 18 receives image information, e.g., an image of a person's face, input from image input unit 3, and identifies the person.

FIG. 12 shows a schematic arrangement of the image collating section. Reference numeral 18a denotes an image storage section; 18b, a normalizing circuit; 18c, a binarizing (thinning) circuit; and 18d, a feature data extraction circuit. Reference numeral 18e denotes a data storage section; 18f, a retrieval circuit; 18g, a collating circuit; and 18h, an output section.

Image storage section 18a stores image information input through image input unit 3, and causes the stored information to be subjected to image collation processing. Normalizing circuit 18b performs normalization processing of image information stored in section 18a, and binarizing section 18c performs binarization processing thereof. More specifically, normalizing circuit 18b normalizes a size of a face in order to identify a person based on an image of the person's face. Binarizing circuit 18c performs edge line segment detection, thinning processing, and the like of the normalized image of the face, thus obtaining binary image data of the image.

Feature data extraction circuit 18d extracts feature data from the normalized and binarized image information. More specifically, in collation processing using the image of a face, an edge of a face is extracted as one feature, and features of eyes, a nose, mouth, and the like in the image are further extracted. In other words, an edge feature is extracted as classified code information, and distance between eyes, size m of a mouth, distance n between an eye and the mouth, and the like are extracted as numerical data.

Data storage section 18e stores feature data of the image of a face obtained in advance for each person, as shown in FIG. 14. More specifically, the feature data of the image of a face are registered with a corresponding person's name as an identification name, and the image data of the face are coupled by pointers.

Retrieval circuit 18f retrieves data storage section 18e based on feature data extracted by feature data extraction circuit 18d. The retrieved data are supplied to collating circuit 18g, and are collated with feature data obtained by feature data extraction circuit 18d.

In the collation processing, assuming that the feature data of an input image obtained by feature data extraction circuit 18d are given as $X_i$ (i indicates a type of feature) and feature data of the image registered in data storage section 18e are given as $Y_i$, the following calculation is performed:

$$D = \sum_i |X_i - Y_i|$$

Then, the feature data having smallest calculation result D is identified as the person. The identification result is output through output section 18h.

Image collating section 18 basically collates an input image, and performs identification of the input image.

Speech recognition section 19 will be described.

Speech recognition section 19 is arranged as shown in FIG. 15. Speech input circuit 19a receives a speech signal input from speech input section 5 or speech signals received by communication unit 12 or 13 through a public telephone line. Circuit 19a comprises an amplifier for amplifying the input speech signal to an appropriate signal level, a band-pass filter for limiting a frequency range, an A/D converter, and the like. A speech input is limited by speech input circuit 19a to a signal having a frequency range of 30 through 3,400 Hz, and is quantized to a 12-bit digital signal at a sampling period of 12 KHz.

Acoustic processing section 19b is constituted by a product sum circuit comprising special-purpose hardware. Basically, circuit 19b performs a high-speed operation in synchronism with speech input circuit 19a in a pipeline manner.

In this case, acoustic processing is executed by two types of band-pass filter groups. One of these filter groups is a 16-channel filter bank. A change in spectrum of the input speech signal is extracted through the filter bank. The other one of the filter groups is a gloss filter in which an identical frequency range is divided into four channels. Acoustic features of a speech input are extracted through the gloss filter.

These two types of filter groups (the filter bank and the gloss filter) are constituted as a 4th-order cyclic digital filter. A filtering output is obtained from the digital filter every 10 msec. Note that the acoustic processing section is controlled by a microprogram system.

Preprocessing/recognition section 19c comprises high-speed processor 19d, pattern matching processing section 19e, word dictionary memory 19f, and buffer memory 19g.

Buffer memory 19g receives a speech signal filtered by acoustic processing section 19b, and accumulates speech data for a maximum of 1.8 sec. High-speed processor 19d executes speech interval detection, resampling, labeling, recognition processing using a transition network, and total decision logic processing for data stored in buffer memory 19g. High-speed processor 19d also controls communication with a host computer and operation of entire speech recognition section 19.

Pattern matching processing section 19e executes matching processing, e.g., composite similarity calculation between the speech data processed by high-speed processor 19d and standard pattern data of a speech word registered in word dictionary memory 19f, thus obtaining a recognition candidate.

For example, a speech word to be recognized is discretely produced. High-speed processor 19d detects an input interval of speech words using an input speech energy calculated every 10 msec during acoustic processing.

More specifically, as shown in FIG. 16, value $E_\theta$ adaptively calculated from a background noise level and an input speech level is used. When the input speech signal level exceeds value $E_\theta$ for a predetermined period of time or more, a time at which the level exceeds value $E_\theta$ is detected as starting point S of a speech word. Thereafter, when the input speech signal level is below value $E_\theta$ for a predetermined period of time or more, a time at which the level is decreased below value $E_\theta$ is detected as end point E of the speech word.

Speech recognition can be regarded as one type of pattern recognition. However, the speech recognition involves problems of a variation in pattern unique to speech data, a personal difference caused by gender, a shape of a vocal organ, vocalization, and the like of a speaker, noise generated by a speaker himself, environmental noise, a level difference and noise caused by transmission through a public telephone line in the case of telephone speech input, and the like. For this reason, the problem is how to perform accurate, stable speech recognition while absorbing the above-mentioned variation factors in consideration of the above problems.

Preprocessing/recognition section 19c employs a so-called hybrid structural matching method combining two stages, i.e., a pattern matching method and a structural analysis method.

When a speech word interval is detected as described above, the speech interval (S, E) is equally divided into 15 sections, and resultant 16 points are used as resampling points. Spectra at the above resampling points are then extracted from 16-channel acoustic data (serial spectrum) which are subjected to the acoustic processing as described above. If the sampling points of the speech data are deviated from the resampling points, spectra at points nearest to the resampling points can be extracted.

With this resampling processing, 16×16 (=256) dimensional pattern vector X is obtained. More specifically, if jth (j=1, 2, 3, ..., 16) resampling point is given as $r_j$, 16-channel spectrum data at point rj are calculated as:

$$S_{irj} = (S_{1rj}, S_{2rj}, \ldots, S_{16rj})$$

These data $S_{irj}$ are reordered to obtain vector X of a speech pattern given by:

$$X = (S_{1r1}, S_{1r2}, \ldots, S_{2r1}, \ldots S_{16r16})^t$$

where t indicates a transposition of a matrix.

A similarity between resultant speech pattern vector X and a standard pattern of a speech word registered in word dictionary memory 19f is calculated by a composite similarity method.

Standard patterns of speech words prestored in word dictionary memory 19f are prepared for word category $\omega_k$ as follows:

$$(\Psi_{1k}, \Psi_{2k}, \ldots, \Psi_{Lk})$$

$$(\lambda_{1k}, \lambda_{2k}, \ldots, \lambda_{Lk})$$

where $$(\lambda_{1k} \geq \lambda_{2k} \geq \ldots \geq \lambda_{Lk})$$

Note that $\Psi_{ik}$ and $\lambda_{ik}$ are respectively proper vectors and corresponding proper values in convariance matrix K of pattern vector X belonging to category $\omega_k$. For the above word dictionary, composite similarity S(k) is calculated as:

$$S(k) = \frac{\sum_{l=1}^{L} \lambda_{lk} \cdot (X, \psi_{lk})^2}{\lambda_l ||X||^2}$$

where $||X||$ is a norm of vector X.

The composite similarity calculation is performed for all the categories, and a pair of a host similarity value and the corresponding category's name are obtained.

The recognition processing which can absorb many pattern variations can be performed by the pattern matching by means of the composite similarity method. However, in similar patterns or patterns including noise, a difference in similarity values between different categories may be decreased.

In order to compensate for the pattern matching method, the following structural analysis method is employed. In the structural analysis, recognition is performed while paying attention to a difference in phonemes constituting a speech word, and two time series of a phoneme label series and an acoustic feature series.

More specifically, the phoneme label series is obtained such that a similarity with a phoneme dictionary is calculated using 16-channel spectra which are calculated every 10 msec in accordance with an input speech signal, and phonemes having a predetermined similarity or more are labeled. In this case, the phoneme label consists of six parameters, i.e., five vowels and a nasal sound. In this case, the phoneme dictionary is preferably prepared for speech data of both male and female subjects.

It is difficult to individually label consonants as phonemes as compared to vowels which are relatively stably produced. Therefore, for consonants, their acoustic features are labeled, and are used as feature information. More specifically, acoustic features are extracted from the output from the 4-channel gloss filter and speech energy which are obtained in the acoustic processing. The acoustic features which are extracted and labeled include 12 types of features, e.g., silence feature, unvoiced feature, fricative feature, explosive, energy dip, and the like, as output features of a gloss filter shown in FIG. 17.

Phoneme/acoustic label series obtained for each speech input are input to a transition network shown in FIG. 18, which is prepared for each word category for a range including the speech interval (S, E).

The presence/absence of a designated phoneme label or acoustic feature is checked for each node of the transition network. If no label or feature is detected, an input series is rejected; otherwise, processing is transited to the next node. The input series which has arrived the goal of the transition network when the feature series is completed is accepted, and its category is then obtained. A checking direction of the series can be reversed depending on each network.

In total decision logic, candidate categories ordered by the pattern matching and the recognition result obtained by the transition network are totaled and a final decision is performed.

More specifically, in the total decision logic, assuming that the maximum similarity obtained by the pattern matching is given as S1, it is compared with predetermined value $\theta$. If $S_1 < \theta$, the similarity is rejected as noise.

However, if $S_1 \geq \theta$, categories having a similarity of $(S_1 - \Delta\theta)$ or more are extracted as candidates using another value $\Delta\theta$. If the number of extracted categories is 1, the category is extracted as the recognition result. If a plurality of categories are extracted, only categories accepted by the transition network are extracted with reference to the analysis result of the transition network. Among these categories, a category having the maximum similarity is obtained as a recognition result.

Note that if no categories accepted by the transition network are included in those extracted by threshold-value processing, it is determined that decision is impossible.

As described above, a pattern recognition processing result by the composite similarity method and a recognition result using the transition network are combined to perform recognition of the speech word input.

FIG. 19 shows a sequence of recognition processing procedures in the speech recognition section. After the speech interval is detected, resampling processing is performed to execute pattern matching, and at the same time, labeling processing is performed to execute checking by means of the transition network. Thereafter, these recognition results are combined to perform total decision logic processing. Such processing is executed in accordance with the processing sequence of high-speed processor 19d.

When not a discretely produced speech word but a word in a continuously produced speech input is to be recognized, the following processing can be performed. In this case, an input speech can be divided into a variety of partial intervals, and word identification is performed for each partial interval to calculate a word similarity.

More specifically, as shown in FIG. 20, all the portions between adjacent analysis frames in the input speech interval are used as boundary candidates of partial intervals, and the input speech interval is divided into a plurality of partial intervals. In this case, for a duration of a word to be recognized, maximum duration Dmax and minimum duration Dmin can be set. Therefore, the partial intervals within the duration need only be recognized.

In the case of FIG. 20, the number of words in a continuously produced speech input is assumed to be 2, and two partial intervals are obtained. However, in general, the number of words in a speech input is indefinite. Therefore, partial intervals can be detected while assuming that 2 through n words are present as word candidates. Word similarity calculation is performed for each of the detected partial intervals, and the most reliable boundaries of the partial intervals are obtained while comparing connection relationships of the similarity calculation results. Then, word recognition results of the partial intervals divided at the boundaries can be calculated.

However, when the partial intervals are obtained to perform word similarity calculation as described above, a large number of partial intervals are obtained, thus interfering with high-speed processing. In practice, in consideration of high-speed processing, partial intervals can be detected under the limitations of, e.g., the number of input words=2 through 5, a duration per word=128 through 640 msec, a ratio of word duration in one speech input=2.5 or less, a frame period=16 msec (every other words are extracted every 8 msec period), and the like.

In this manner, words in a continuously produced speech input can be effectively recognized.

Learning of a dictionary (word dictionary) subjected to the above speech recognition processing is performed as follows.

The learning processing is classified into (1) processing for obtaining a characteristic nucleus from vowel and consonant patterns and (2) processing for obtaining a proper value and a proper vector corresponding to the characteristic nucleus. The N proper values and the N proper vectors are obtained from the largest proper value. This processing is normally called KL development.

The processing for obtaining the characteristic nucleus will be explained first. If a column vector of a learning pattern is given as $S_m$, characteristic nucleus K of the input speech pattern (learning pattern) is calculated as follows:

$$K = (1/M) \sum_{m=1}^{M} S_m S_m^t$$

$$S_m = (S_{m1}, S_{m2}, \ldots S_{mn})^t$$

Note that the learning pattern is given as a 64-dimensional column vector in the case of a consonant pattern. In the case of a vowel pattern, the learning pattern is given as a 16-dimensional column vector.

Characteristic nucleus K is calculated such that for m learning patterns, components of a matrix generated by multiplying column vectors $S_m$ and row vectors $S_m$ obtained by transposing column vectors $S_m$ are averaged over m learning patterns. Therefore, the number of components of the characteristic nucleus is a square of that of the vector.

Note that in order to obtain characteristic nucleus K reflecting a pattern distribution of a corresponding category with the above processing, a given number of learning patterns are necessary. For this purpose, a predetermined number of learning patterns must be stored in a learning pattern memory.

However, in the case of vowels, since a 16-dimensional vector is adopted, learning patterns of a minimum of 6 categories need only be prepared. However, in the case of consonants, 101 categories are present, and 64-dimensional data must be calculated. For this reason, an extremely large memory capacity is required.

In order to obtain characteristic nucleus K reflecting a pattern distribution using a small number of learning patterns, the following updating processing of the characteristic nucleus is performed, so that the characteristic nucleus is improved to reflect the pattern distribution by calculations.

That is, the following calculation is repetitively executed:

$$K = K' + \omega S_n S_n^t$$

where w is a weighting coefficient upon updating of the characteristic nucleus. Weighting coefficient w can take both positive and negative values. If coefficient w is a positive value, it increases a similarity for an input pattern of a characteristic nucleus matrix; otherwise, it decreases the similarity.

K' indicates a characteristic nucleus before learning pattern $S_n$ is learned, and K indicates a characteristic nucleus which is updated by learning of learning pattern $S_n$.

Thereafter, the proper value and proper vector of the resultant characteristic nucleus are calculated, and a standard pattern used for the above-mentioned composite similarity calculation is generated based on the proper value and the proper vector.

The standard pattern can be obtained by KL development of the characteristic nucleus. For example, the standard pattern can be calculated by KL development by means of power calculation.

Assume that characteristic nucleus K has proper values $\lambda_1, \lambda_2, \ldots, \lambda_n$, and corresponding proper vectors $\xi_1, \xi_2, \ldots, \xi_n$. In this case, arbitrary vector $u_0$ is expressed as follows by linear-combining proper vectors $\xi_1, \xi_2, \ldots, \xi_n$:

$$u_0 = \sum_{i=1}^{n} a_i \xi_i$$

In this case, since the following relation is established:

$$K \xi_i = \lambda_i \xi_i$$

then, $$K_s u_0 = K_s \left( \sum_{i=1}^{n} a_i \xi_i \right)$$

$$= K^{s-1} \left( \sum_{i=1}^{n} a_i \lambda_i \xi_i \right)$$

$$= \ldots = \sum_{i=1}^{n} a_i \lambda_i^s \xi_i$$

Since $$|\lambda_1| > |\lambda_2| > \ldots > |\lambda_n|$$

$$K^s u_0 = \lambda_1{}^s \left[ \alpha_1 \xi_1 + \Sigma \alpha_i \frac{\lambda_i{}^s}{\lambda_1{}^s} \xi_1 \right]$$

$$[\lambda_i/\lambda_1] > 1 \ (i = 2, 3, \ldots, n)$$

then,
if S is sufficiently increased, the second term of the above equation is converged to 0.

Therefore, the above equation can be written as:

$$K^s u_0 = \alpha \lambda_1{}^s \xi_1$$

This indicates that a ratio of ($K^{s+1} u_0$) to ($K^s u_0$) is proper value $\xi_1$. In addition, ($K^s u_0$) is proportional to proper vector $\xi_1$.

During the calculation process based on the above theory, the result may often be scaled out immediately.

In order to prevent this, $u_0$ is given as an arbitrary unit vector, and the following calculations are executed:

$$v_{s+1} = K_{u0}$$
$$u^{s+1} = (v_{s+1})/(b_{s+1})$$
$$(s = 0, 1, 2, \ldots)$$

where ($b_{s+1}$) is a component of vector ($v_{s+1}$) having a largest absolute value. In this case, since $$\begin{aligned} u^{s+1} &= (v_{s+1})/(b_{s+1}) \\ &= (Ku_s)/(b_{s+1}) \\ &= (Kv_s)/(b_{s+1} b_s) \\ &= (K^{s+1} u_0)/(b_{s+1} \ldots b_s) \end{aligned}$$

then, $\lambda_1$, $b_{s+1}$, $\xi_1$, and $u_{s+1}$ can be calculated therefrom.

After proper value $\lambda_1$ having the largest absolute value and proper vector $\xi_1$ are calculated as described above, proper value $\lambda_2$ having the second largest absolute value and proper vector $\xi_2$ are calculated.

Assuming $$K' = K - \lambda_1 \xi_1 \lambda_1{}^t$$

from $$\xi_1 {}^t \xi_i = 0 \ (i = 2, 3, \ldots, n)$$

then $$\begin{aligned} K'\xi_1 &= K\xi_1 - \lambda_1 \xi_1 {}_1{}^t \xi_1 \\ &= \lambda_1 \xi_1 - \lambda_1 \xi_1 = 0 \ (i = 1) \end{aligned}$$

$$\begin{aligned} K'\xi_1 &= K\xi_i - \lambda_1 \xi_i \xi_i {}^t \xi_i \\ &= \lambda_i \xi_i (i \neq 1) \end{aligned}$$

Therefore, it can be understood that K' has the proper value given by:

$$|\lambda_2| > \ldots > |_r| > \ldots > |\lambda_n| > 0$$

Note that $\xi_i$ is assumed to be normalized.

The processing can be achieved by repeatedly executing the above-mentioned processing for K' which is obtained by converting the characteristic nucleus given as:

$$K' = K - \lambda_1 \xi \cdot \xi^t$$

With this processing, the proper values having larger absolute values and corresponding proper vectors are sequentially calculated, and learning of the dictionary can be performed.

Figure 21:
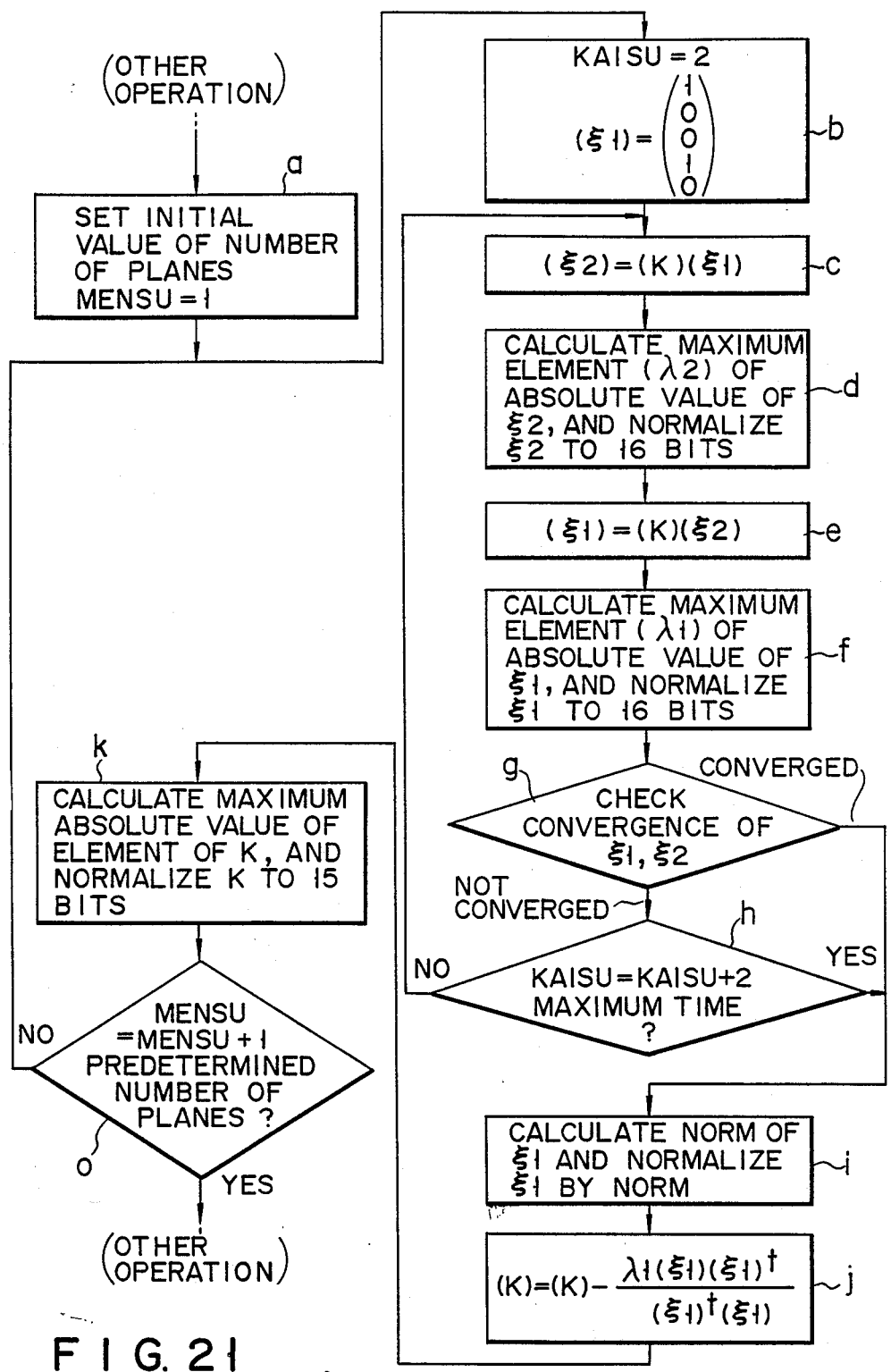
FIG. 21 is a flow chart showing learning processing procedures of a speech recognition dictionary.

FIG. 21 shows procedures of dictionary learning processing executed based on the above-mentioned calculation algorithm.

Character recognition section 21 will be described hereinafter.

Character recognition section 21 is constituted by a first character recognition block for recognizing a character read by a scanner or the like, and a second character recognition block for recognizing character information input through a tablet or the like in an on-line manner.

The first character recognition block comprises image memory 21a for storing image data read by the scanner or the like, area detection section 21b for detecting an area where characters to be recognized are written from image data stored in image memory 21a, character extraction section 21c for extracting character data to be recognized from image data stored in image memory 21a in accordance with the area detection result, and identification section 21e for collating each standard character pattern of a character dictionary 21d, with the character pattern extracted by character extraction section 21c to perform character recognition, as shown in FIG. 22.

The character recognition block recognizes characters written in character frames 21g which are set on predetermined positions on FAX transmission original sheet 21f and where a destination is written, as shown in FIG. 23. Original sheet 21f on which the destination is written is sent first if an original to be transmitted includes a plurality of sheets. Image data read from the first original is stored in image memory 21a for the purpose of character recognition processing.

Area detection section 21b obtains position information of character frames 21g from formation information of FAX transmission original sheet 21f, and detects an area where characters to be recognized are written. Character extraction section 21c individually extracts image data of characters written in character frames 21g using area detection information and projection pattern information of the image information, as shown in FIG. 24.

As disclosed in Japanese Patent Publication No. 49-12778, identification section 21e extracts features of a character pattern from the extracted character image, and performs pattern matching between the extracted character pattern and a standard pattern for each character stored in standard pattern dictionary 21d. With this pattern matching, a character category of the standard pattern with which the collation is successful is obtained as a recognition result.

Note that the pattern matching method may be modified, as a matter of course.

The second character recognition block for recognizing character information input through the tablet or the like in an on-line manner is arranged as shown in FIG. 25.

The second character recognition block comprises coordinate detection ciruuit 21h for sequentially detecting a series of coordinate positions representing a writing stroke of a character which is input through the tablet in an on-line manner.

Time series data of coordinate positions detected by coordinate detection circuit 21h is input to preprocessing circuit 21i, so that small noise components such as a detection error on tablet 4 are removed therefrom. Thereafter, the time series data is sequentially stored in coordinate system storage circuit 21j and is then subjected to character recognition processing. Note that if one character is input, size normalization processing of the character is performed.

Number-of-stroke detection circuit 21k detects the number of writing strokes of the character pattern based on divisions of writing strokes (divisions of a time series of coordinate position data).

Recognition processing section 21m selectively extracts a standard pattern having the corresponding number of strokes from standard patterns of categories of characters to be recognized. Then, the feature of each stroke of the standard pattern is compared with that of the stroke of the input character pattern stored in coordinate system storage circuit 21j (to perform matching processing). Answer determination circuit 21p determines a matching processing result, and obtains a category of a character to be recognized having strokes corresponding to the strokes of the input character pattern as a recognition result.

More specifically, the feature of the writing strokes of a character pattern which is input in an on-line manner is subjected to matching processing with the feature of the strokes of the standard character pattern to recognize the input character pattern.

Note that as the feature of the strokes, coordinate position information of, e.g., end points, intersections, inflection points, and the like when writing strokes are subjected to polygonal-line approximation, can be used.

Character recognition section 21 comprising the above functions recognizes character information read by the scanner or the like, or character information input through a coordinate position input device, e.g., a tablet, in an on-line manner.

Graphic recognition section 22 will be described hereinafter.

Graphic recognition section 22 is arranged as shown in FIG. 26. Input section 22a stores a graphic image input by imaging, and causes the image to be subjected to graphic recognition processing. Edge trace section 22b classifies trace directions of line segments into 8 directions, as shown in FIG. 8, and sequentially obtains trace directions when an edge of a graphic image in an input image is traced. More specifically, assuming that a triangle is traced counterclockwise, information of the trace directions is obtained as a series of direction codes:

"1,2, ... 2,3,4, ... ,4,5,7, ... ,7"

Segmentation section 22c extracts differential points e.g., curve portions from the series of direction codes, and divides the edge of the graphic image into a plurality of feature portions in accordance with the differential points. Matching section 22d performs matching processing between graphic edge information which is segmented as described above, and feature information of various graphic images registered in dictionary memory 22e, thereby recognizing an input graphic image.

For example, if a graphic image shown in FIG. 29 is given, sums of direction codes are sequentially calculated at three adjacent edge points (i−1, i, i+1) in accordance with the series of direction codes obtained by edge tracing, and are subjected to smoothing processing as a direction code at central edge point i. With this smoothing processing, noise components are removed.

Thereafter, an end point as a feature point of the edge, i.e., a point where a curvature is large, is detected by segmentation section 22c, and the edge is divided to have the end point as the center. Each of the divided edge portions is collated with dictionary memory 22e to obtain a recognition result.

With the above processing, since no end point is present in a circle, three end points are detected in a triangle, four end points are detected in a rectangle, as illustrated in FIG. 30, and these figures are respectively identified and recognized. In this case, information of, e.g., a projecting end point, a linear or curved edge connecting end points, and the like, can be utilized in graphic identification.

Image recognition section 23 is arranged as follows.

Figure 31:
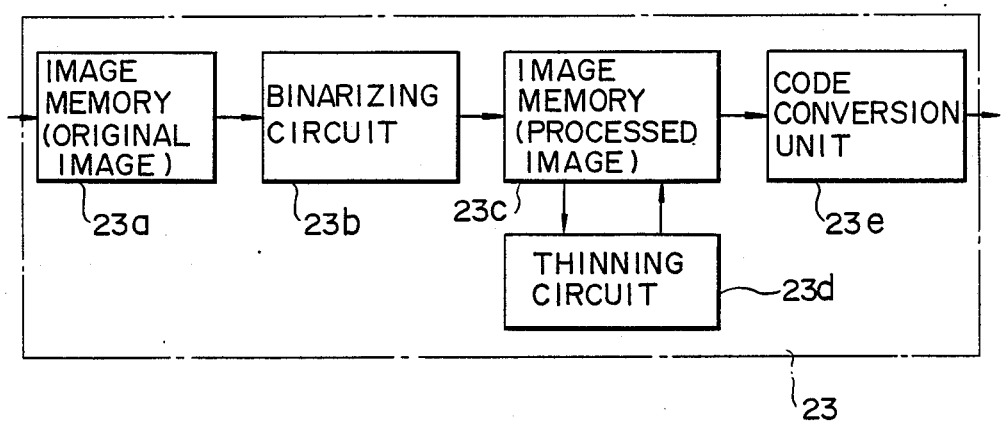
FIG. 31 is a block diagram showing an arrangement of an image recognition section in the work station.

FIG. 31 shows a schematic arrangement of image recognition section 23, which comprises original image memory 23a, binarizing circuit 23b, processed image memory 23c, thinning circuit 23d, and code conversion unit 23e.

Image memory 23a stores an image to be recognized. Binarizing circuit 23b binarizes the image stored in memory 23a, and stores the binarized image in image memory 23c. The binarizing level can be varied while monitoring a binarized image on a display.

Thinning circuit 23d performs thinning processing of the binarized image to form a line image. Image memory 23c is rewritten by the thinned image, and the data in memory 23c is then subjected to recognition processing.

Figure 32:
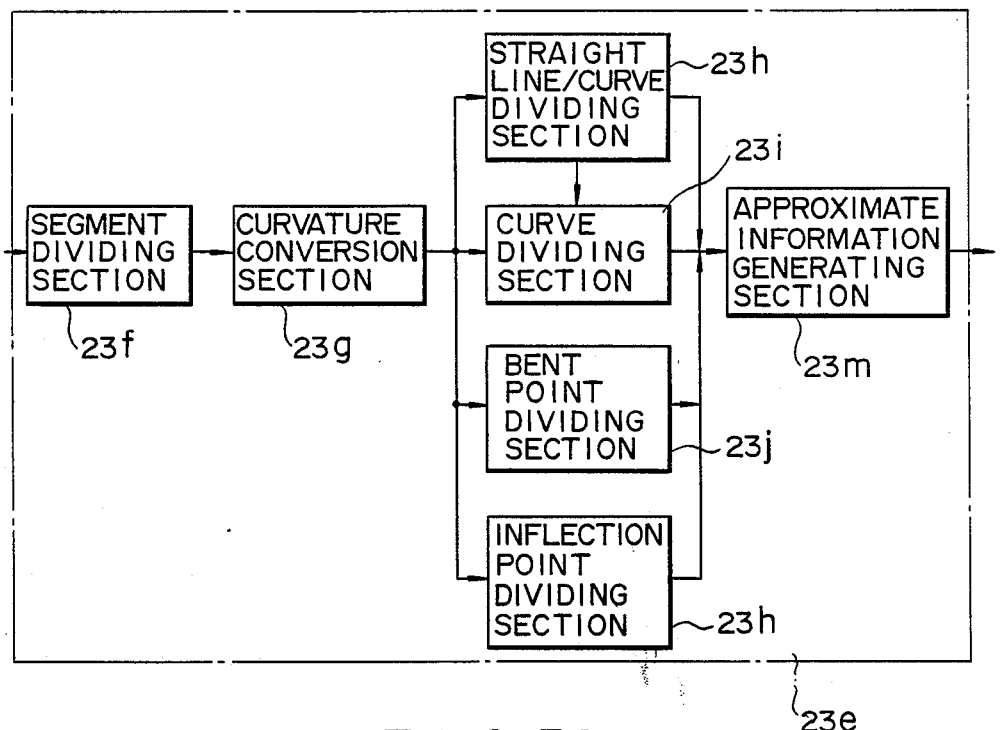
FIG. 32 is a block diagram showing an arrangement of a code conversion unit.

Code conversion unit 23e is arranged as shown in FIG. 32. Segment dividing section 23f divides the thinned image into a plurality of segments. The division of segments is performed by dividing a line figure at its end point, branching point, or intersection. Curvature conversion section 23g calculates curvatures of the plurality of segments divided as described above.

Straight line/curve dividing section 23h, curve dividing section 23i, bent point dividing section 23j, and inflection point dividing section 23h divide the divided segments in accordance with their curvature information, thereby detecting an inflection point, a switching point between a straight line and a curve, a bent point, a point of change in radius in a curve, and the like. Information of each of portions constituting the line figure image can be extracted by segment division and feature point detection.

Approximate information generating section 23m combines the information of the divided segments and feature points in the segments to obtain information representing the original figure, e.g., coordinate positions of starting and end points of each segment, and code information specifying the type of the segment.

Figure 33:
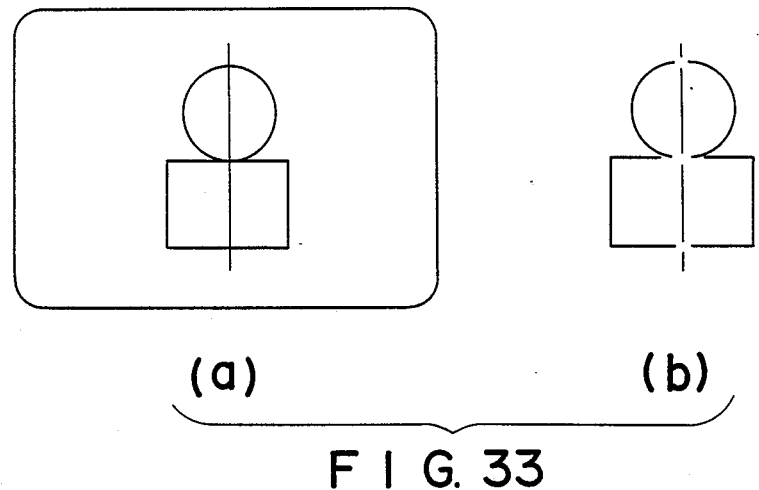
FIG. 33 is a view showing processing examples of an input image.

When an input image is given as shown in FIG. 33(a), line FIG. 23n in the input image is thinned and extracted, and is then divided into segments as shown in FIG. 33(b). In this case, line FIG. 23n in which a circle and a rectangle are pierced by a straight line is input. Line FIG. 23n is divided at its intersections, as shown in FIG. 33(b), and is segmented into two semi-circles, two U-shaped figures, and four straight lines.

Figure 34:
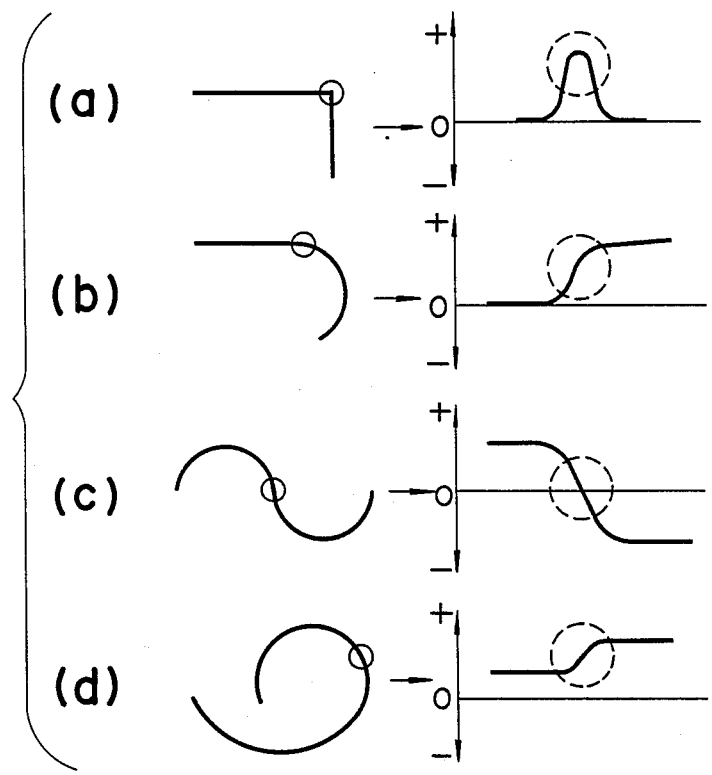
FIG. 34 is a view showing feature point detection in a segment.

Curvature conversion section 23g calculates curvatures of the divided segments, as shown in FIG. 34.

Straight line/curve dividing section 23h, curve dividing section 23i, bent point dividing section 23j, and inflection point dividing section 23h detect feature points of the segments. More specifically, in the case of FIG. 34(a), since a curvature at a bent point of two straight lines is immediately increased, the bent point can be detected from the change in curvature. In the case of FIG. 34(b), since a change in curvature is detected at a changing portion from a straight line to a curve, the feature point can be detected from the change in curvature.

Similarly, in the cases shown in FIGS. 34(c) and 34(d), feature points in the segments can be detected from changing points of the curvatures.

In image recognition section 23, an input figure is divided into segments, and feature points of the segments are detected. Then, the line figure is approximated and recognized as code information indicating the type of each of segments, and their coordinate positions.

Speech collating section 17 is arranged as follows. Speech collating section 17 recognizes (identifies) a speaker who makes a speech input, and is arranged as shown in FIG. 35.

More specifically, a speech input supplied through speech input section 17a is filtered by phoneme filter 17b and personal filter 17c, thereby extracting speech features. The frequency range of each of a plurality of channels of phoneme filter 17 is set by equally dividing a speech frequency range, as shown in FIG. 36(a). Phoneme filter 17b having such filter characteristics extracts feature parameters indicating phonemic features of a speech input. Note that the frequency range of each channel can be set by dividing a speech frequency range in a logarithmic function manner.

The frequency range of each of a plurality of channels of personal filter 17c is set by dividing the speech frequency range exponentially. Personal filter 17c having such filter characteristics extracts more speech features from the low- to intermediate-frequency range of the speech input than those in the high-frequency range. The filter outputs from the channels are obtained as feature parameters for collating a person.

Word recognition section 17d recognizes a word represented by the speech input in accordance with the phonemic feature parameters obtained through phoneme filter 17b with reference to word dictionary 17e. The word recognition function is the same as that of speech recognition section 19, and the function of section 19 can be utilized without modification. A dictionary to be subjected to personal collation is selected from personal dictionary 17f in accordance with the word recognition result. In personal dictionary 17f, analysis results of specific words produced in advance by a person to be collated by personal filter 17c are classified and stored in units of words.

Speaker collating section 17g calculates similarities between the feature parameters of the corresponding word selected from personal dictionary 17f and those of the speech input obtained by personal filter 17c, and discriminates the similarities by a predetermined value. These discrimination results are compared with each other, and a personal category from which a feature parameter having the highest similarity and a large difference from the next highest similarity is obtained is identified as a speaker who makes the speech input.

The characteristics of personal filter 17c will be described in more detail. As described above, filter 17c has different characteristics from those of phonemic feature filter 17b. Identification properties of personality of speech will be examined below. The identification properties can be evaluated by an F ratio given by the following relation:

F ratio=(interpersonal variance)/(intrapersonal variance)

The F ratio of each channel output of the filter characteristics in phoneme filter 17b exhibits an exponential function tendency indicated by a solid curve in FIG. 37. Thus, in a conventional system, personal collation is performed by utilizing high-frequency speech feature information.

However, if personal identification can be achieved by utilizing not only the high-frequency feature of speech but also speech features within the entire frequency range, collation precision can be further improved. More specifically, if the F ratio exceeds 1 within the entire frequency range and the interpersonal variance exceeds the intrapersonal variance, further accurate personal collation can be realized.

Therefore, the characteristics of personal filter 17c are determined exponentially, as described above. Feature extraction is roughly made in a high-frequency range where personal features are conspicuous, and low-frequency speech features are finely extracted by increasing the number of low-frequency channels.

More specifically, since a change in F ratio indicates an exponential function tendency, a filter bank is arranged such that a frequency range of low-frequency channels is exponentially increased from that of high-frequency channels, and the filter bank is used as personal filter 17c.

According to the channel outputs of filter 17c with the above arrangement, the F ratio changes as indicated by a broken curve in FIG. 37, and as can be seen from FIG. 37, and the F ratio is greatly improved in the intermediate-frequency range. As a result, personal collation can be performed by utilizing not only the high-frequency speech features but also the intermediate-frequency speech features, thus improving collation precision.

More specifically, in speech collating section 17, feature information in which personality is conspicuous is extracted by improving the filter bank in addition to features subjected to word recognition of the speech input. As a result, personal identification, i.e., personal collation can be accurately performed independently of phoneme recognition of the speech input.

Speech synthesis section 26 will be described hereinafter.

Speech synthesis section 26 comprises discriminator 26a, decoder 26b, rule synthesizing parameter generating unit 26c, and speech synthesizer 26d, as shown in FIG. 38.

Discriminator 26a discriminates whether an input code string corresponds to a character string or a code string indicating analysis parameters for speech synthesis. The information discrimination is performed by discriminating identification information added at the beginning of the input code string. If it is discriminated that the input code string corresponds to the analysis parameters, the code string is supplied to decoder 26b, and is decoded to obtain phoneme and rhythm parameters.

If it is discriminated that the input code string corresponds to the character string, the character string data is supplied to rule synthesizing parameter generating unit 16c to be subjected to generation of phoneme and rhythm parameters.

Speech synthesizer 26d processes a sound source wave through a speech-path approximating filter in accordance with the phoneme and rhythm parameters obtained by decoder 26b or rule synthesizing parameter generating unit 26c, thus generating a synthesized speech wave.

Rule synthesizing parameter generating unit 26c will be described in more detail. Unit 26c is arranged as shown in FIG. 39. Character string analysis section 26e individually identifies words in an input character string with reference to language dictionary 26f to obtain accent information and grammar information such as word/clause boundary, part-of-speech/conjugation, and the like of the word. Phoneme and rhythm rules are applied to the analysis result, and control information therefor is generated.

The phoneme rule provides pronunciation information of an analyzed word, and realizes a phenomenon such as sonant or unvoicing caused by connection of words, thus generating a phonemic symbol string. Speech parameter generating section 26g receives the phonemic symbol string, and sequentially obtains syllable parameters from CV file 26h in accordance with the syllable unit of the string, so that the parameters are interpolated and coupled. Speech parameter generating section 26g generates a phoneme parameter string from the phoneme symbol string.

The rhythm rule determines a boundary or breath position of speech in accordance with grammar information such as word/clause boundary, and also determines a duration or pause length of each sound. At the same time, in accordance with the rhythm rule, a rhythm symbol string is generated on the basis of a fundamental accent of each word and in consideration of a clause accent. Rhythm parameter generating section 26i receives the rhythm symbol string, and generates a rhythm parameter string representing a pattern of a change over time in pitch.

When the input code string corresponds to a code string representing analysis parameters for speech synthesis, decoder 26b operates as follows.

More specifically, when the code string of the analysis parameters indicates a cepstrum coefficient of the CV file, code string 26m is compressed such that bits are assigned to parameter P (pitch) and C0, C1, ..., Cm (cepstrum coefficients), as shown in FIG. 40. Decoder 26b converts and decodes the compressed analysis parameters to the number of bits suitable for speech synthesizer 26d using parameter conversion table 26n. For example, each parameter is converted to 8-bit data, thus obtaining a phoneme parameter string (cepstrum coefficient) and its rhythm parameter string (pitch).

Speech synthesizer 26d comprises voiced sound source 26q and unvoiced sound source (M-system generator) 26r, and selectively generates a voiced sound source wave ($P \neq 0$) or an unvoiced sound source wave ($P = 0$) in accordance with pitch data P of the input rhythm parameter string. The sound source wave is input to preamplifier 26s, is level-controlled in accordance with cepstrum coefficient C0 of the rhythm parameter, and is then input to logarithmic amplitude approximate digital filter 26t. Filter 26t constitutes a resonance circuit for approximating speech path characteristics in accordance with cepstrum coefficients C1 through Cm of the rhythm parameter, and filters the sound source wave. Filter 26t synthesizes and outputs speech data represented by the phoneme and rhythm parameters.

The signal synthesized by filter 26t is supplied to D/A converter 26u, and is then filtered through LPF 26v. Thereafter, a synthesized speech signal (analog signal) is output.

In speech synthesis section 26 with the above arrangement, speech data indicated by an input data string is synthesized from the input data string, and is output.

Image synthesis section 27 will be described hereinafter.

Image synthesis section 27 comprises control computer 27a, display file memory 27b, image synthesis circuit 27c, image memory 27d, and display 27e (if necessary), as shown in FIG. 42. Display 27e can be display section 10 prepared for the work station.

Image synthesis circuit 27c reads out vectors or parameters of polygons or arcs written in display file 27b under the control of special-purpose control computer 27a, generates a line image represented thereby, and writes the generated image at designated addresses of image memory 27d. A designated line image is constituted on image memory 27d by the image generating function of image synthesis circuit 27c. The line image is displayed on display 27e to be monitored under the control of control computer 27a.

Image generating circuit 27b has a special processing function and a painting processing function of a generated image. The special processing function consists of functions of deleting hidden lines for overlapping images, of clipping processing, and the like. The painting processing function consists of a function of painting a partial area of an image in a designated color.

Various images can be generated by the above-mentioned function of image synthesis circuit 27, and its synthesis processing is performed.

Synthesis of a generated image and a natural image are classified to the following two processing modes. In one processing mode, an image obtained by computer processing is put in a natural image such as a photograph of a landscape as a background image. In the other processing mode, a natural image is put in a two-dimensional image stored in the computer as an internal model.

In the former processing mode wherein the generated image is put in the natural image, as shown in FIG. 43, a code indicating "transparent color" is provided in an image generated by the computer, and is overlaid and synthesized with a natural image. The natural image information is displayed in an image region with the "transparent color" code, and the image computed by the computer is displayed in the remaining region. As a result, image synthesis can be realized using the natural image as a background image. This technique is called an overlay method.

Alternatively, as shown in FIG. 44, a natural image is written in the image memory, and an image computed by the computer can be written thereon. This technique is called a Z buffer method. This method can be relatively easily realized as well as the overlay method described above.

The latter processing mode wherein a natural image is put in a two-dimensional image presented as the internal model of the computer is achieved by the following high-speed processing.

Coordinate conversion necessary for putting a natural image on a given plane in another plane directed in an arbitrary direction in a three-dimensional space is given by the following relations:

$$u=(C_1X+C_2Y+C_3)/(C_4X+C_5Y+C_6)$$

$$v=(C_7X+C_8Y+C_9)/(C_4X+C_5Y+C_6)$$

where X and Y are coordinates on a display surface, and u and v are coordinates on the natural image.

If such coordinate conversion processing is executed without modification, 6 multiplications and 2 divisions are required each time one pixel is displayed, and hence, a large amount of calculation and much computing processing time are necessary.

In view of this, the above-mentioned calculations are executed by two conversion processing operations through the following intermediate coordinates (s,t):

$$u=(\alpha_1 s+\alpha_2 t+\alpha_3)/t \qquad (1)$$

$$v=(\alpha_7 s+\alpha_8 t+\alpha_9)/t$$

$$s=C_5X-C_4Y \qquad (2)$$

$$t=C_4X+C_5Y+C_6$$

More specifically, perspective conversion is performed using above-mentioned equation (1), and thereafter, two-dimensional affine conversion is performed using equation (2) to perform perspective conversion onto an arbitrary plane at high speed.

Since the denominator of equation (1) is coordinate t itself, the corresponding calculation can be easily executed at high speed by slightly modifying a conventional affine conversion circuit.

In this manner, image synthesis section 27 executes image synthesis processing at high speed.

Output format selection section 24 will be described hereinafter.

Output format selection section 24 is energized upon reception of a media selection request signal, and selects a data output medium. More specifically, section 24 selects, from a variety of media, a medium through which information is transmitted.

FIG. 45 shows a schematic arrangement of output format selection section 24. Section 24 comprises media selection control section 24a, input media determination section 24b, destination media determination section 24c, media conversion table 24d, and self media function table 24e. FIG. 46 shows a processing flow of output format selection section 24. The functions of output format selection section 24 will be described along the flow of the processing procedures.

When a media selection request signal is received, media selection control section 24a requests, to control section 2, supply of input media information necessary for a media selection operation. Section 24a supplies a media information detection request and a media function identification request to input media determination section 24b.

Input media determination section 24b comprises media detection section 24f and media identification section 24g. Section 24b detects an input medium supplied from control section 2 upon reception of an information request from media selection control section 24a, and identifies the function of the detected medium. When an input medium corresponds to a speech input, section 24b determines that the function of is ADPCM.

Thereafter, media selection control section 24a inquires whether a data output destination is another function block in a self terminal (in a self work station) or is another work station or communication terminal connected through a communication line or the like. If it is instructed that data is to be output to another work station or communication terminal, media selection control section 24a requests identification information associated with a destination station to control section 2. Upon reception of this request, information associated with the data output destination is input to destination media determination section 24c.

Destination media determination section 24c comprises destination identification section 24h destination media identification section 24i, and function identification section 24j, and is operated in response to an identification information determination request from media selection control section 24a. A destination station is identified from identification information for the destination station, and then, a medium of the destination station is identified. Thereafter, the function of the destination station media is identified.

More specifically, section 24c identifies that a destination station to which data is to be output (transmitted) is an automatic FAX, its communication medium is an image, its function is a GIII type, and the like. Note that identification of the destination station may be performed based on information sent from the destination station using a negotiation (hand-shake) function If the destination station has no negotiation function, the media detection function may be provided to function identification section 24j. Function identification can be performed in accordance with a media information signal from the destination station.

FIG. 47 shows the flow of identification processing procedures of the destination station. As shown in the flow, it is checked whether or not the communication destination station is a telephone. If it is determined that the destination station is the telephone, it is then checked if a FAX signal is supplied therefrom.

If the destination station is the telephone and the FAX signal is supplied, it can be determined that destination equipment is the FAX. If it is determined that the destination station is the telephone and no FAX signal is supplied, it can be determined that the destination equipment is a normal telephone. If it is determined that the destination station is not a telephone, it can be determined that the destination equipment is communication equipment other than the telephone.

After the medium of the communication destination is identified, media selection control section 24a obtains media conversion selection information corresponding to an input medium, an input function, the destination equipment, destination equipment medium, and a function of the destination equipment with reference to media conversion table 24d, which is arranged as shown in FIG. 48.

For example, if the input medium is speech, its function is ADPCM, and the destination equipment is a GIII type FAX, it is determined that the destination equipment medium is an image, and its major media conversion function is:

(speech) to (code character)
(code character) to (image)

It is also determined that the conversion function can be realized by:

(ADPCM; speech) to (GIII; FAX)

In this case, if there is slave media conversion information, it can be simultaneously obtained.

The media conversion information is supplied to control section 2, and the data output format is selectively designated.

If data output is performed inside the self work station, media selection control section 24a refers to self media function table 24e to obtain an output format capable of outputting data. Media selection control section 24a similarly obtains media conversion information with reference to the self media conversion table in media conversion table 24d in accordance with the above-mentioned format, and supplies it to control section 2.

In accordance with the media conversion information thus obtained, document information given in the form of a character code string is converted to speech information and is output using speech synthesis section 26, or speech information is converted to information of a character code string and is output using speech recognition section 19.

Database section 32 will be described hereinafter.

Figures 49, 50:
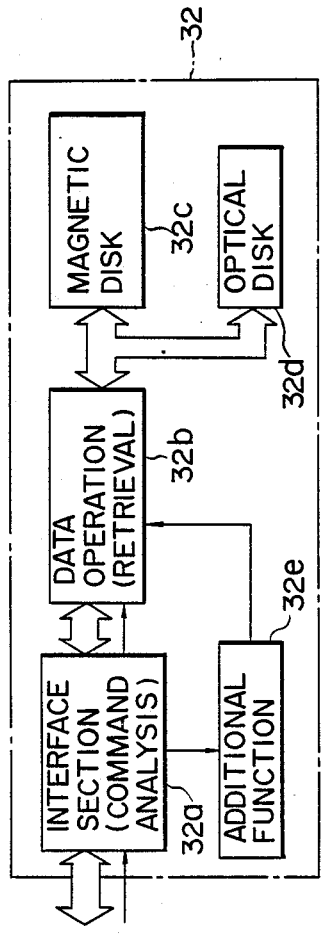
FIG. 49 is a block diagram showing a database section in the work station.
FIG. 50 is a view showing a data format of a database.

Database section 32 classifies and stores various kinds of data such as codes, images, speech inputs, and the like, and provides them to a variety of application systems. FIG. 49 shows a schematic arrangement of database section 32. Section 32 comprises interface section 32a for executing command analysis processing and the like, data operation section 32b for executing retrieval processing of a database, magnetic disk unit 32c and optical disk unit 32d as storage media for storing various data, and additional function section 32e.

A variety of data are classified into a plurality of relations in accordance with the types of data, and are registered in units of relations to constitute a database.

A logic structure, data to be stored, a physical structure, and an additional function of database section 32 will be described hereinafter.

The logic structure represents the way to store various data, when database section 32 is viewed from an application system. In this case, as the logic structure according to a relational model, data is processed as an image of a table as shown in FIG. 50.

The table (relation) includes some columns (attributes). Each of these columns stores a predetermined unit of data. The data unit (tuple) is determined as a set of values to be stored in each attribute. An arbitrary number of attributes each storing such a tuple constitute one relation.

In this model, however, a relation name is designated, and a value of each attribute is input, so that data is stored in the database. Retrieval of the database is performed such that the relation and the attribute are designated, it is checked if a value stored therein satisfies a predetermined condition with a designated value or a value stored in another attribute, and a tuple satisfying the condition is extracted.

The retrieval condition is given such that these values are equal to each other, not equal to each other, one is smaller than the other, one is larger than the other, or the like. In this case, a retrieval condition is designated for each of a plurality of attributes, and the condition determination results can be subjected to logic processing (ANDing or ORing). Alternatively, database retrieval may be performed such that a plurality of relations are designated, and a predetermined tuple is obtained from a plurality of relations by checking if it satisfies a condition that a value of a given attribute in a given relation is equal to a given attribute in another relation, or the like.

Basically, data deletion from the database is performed in the same manner as in the retrieval. However, in place of extracting a tuple, the tuple is deleted.

In each relation, information of a person (his or her name or a person-in-charge code) who is permitted to read, add, and change data is written in each attribute to assume data protection. Note that data protection may be made in units of relations in place of attributes. Note that information of a person in this case may be a plurality of pieces of information.

In the case of the relation shown in FIG. 50, data is illustrated as a character string. Data stored in each relation can be a simple bit string. That is, data to be stored in each relation can be image information, speech information and the like as well as the character string.

Data stored in the database consists of various relations such as "address book", "personal job & its agent", "operation history", "personnel", "meeting room", "meeting room reservation", "meeting", and the like shown in FIG. 51 in addition to "personal schedule" shown in FIG. 50.

The relations shown in this case can be classified into those which are personally used and those which are commonly used by many users. Personal relations are provided to each work station of a person, and common relations are provided to a common work station to a plurality of users.

Note that the common work station does not always mean that its hardware is different from that of other work stations. The personal work stations can also serve as the common work station. Furthermore, the number of common work stations is not limited to one, but can be increased in accordance with a hierarchical level of the system. That is, the common work station which is easily distinguished from a plurality of work stations is set.

The data structure of relation "personal schedule" shown in FIG. 50 will be described below.

This relation reveals that its relation name is "personal schedule" and this relation is created by "ΔΔΔΔ". The creator "ΔΔΔΔ" of this relation is permitted to perform all the data operations of this relation.

According to a data protection function added to this relation, read access of data is allowed to all the members, and data addition is permitted to only "oooo" and "persons belonging to technical department". Note that the "persons belonging to technical department" are determined by referring to, e.g., relation "personnel". Data modification is permitted to only persons whose "personal level" exceeds "5". The "personal level" is associated with the personnel relation, and represents positions like (chief of department; 8), (vice-chief of department; 7), (chief of section; 6), (chief; 5), and so on.

In this relation, attributes "start time", "end time", "type", "name", "place", and the like are set, and data are written in these attributes.

The physical structure for storing the variety of relations described above in database section 32 in practice will be described hereinafter.

An information storage section comprises magnetic disk unit 32c and optical disk unit 32g which can read/- write a desired portion at relatively high speed and are not so expensive.

Figure 52:
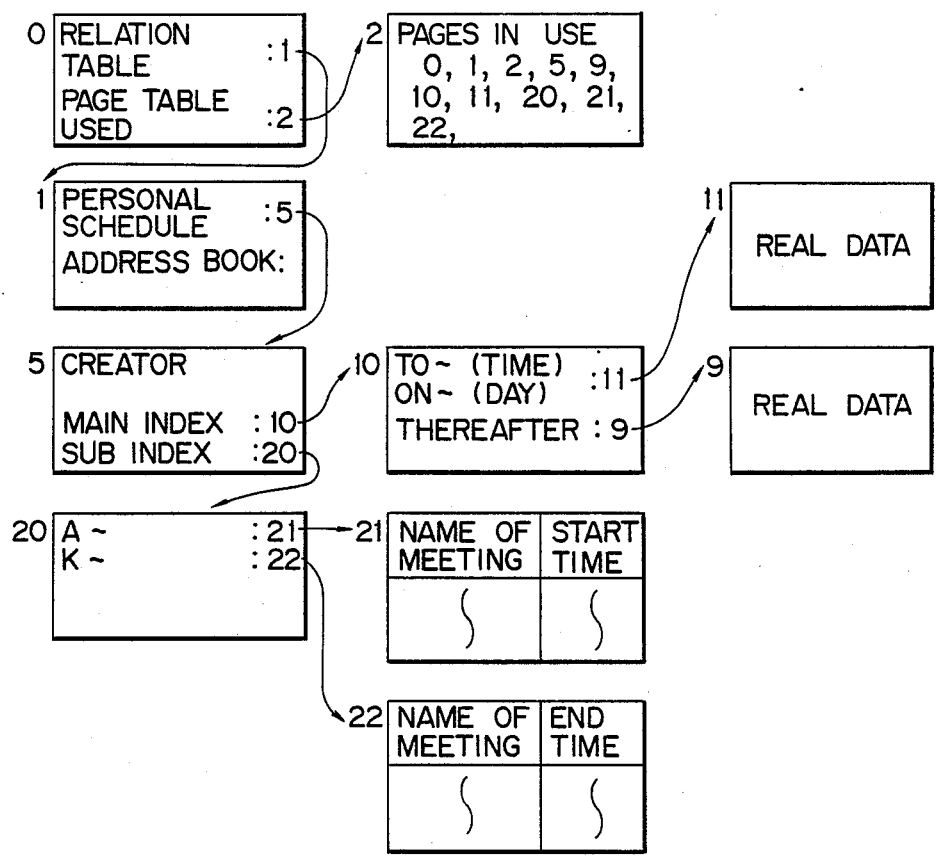
FIG. 52 is a view showing a structure of a relation.

The database is stored in this information storage section as follows. The storage area of the information storage section is divided into sections having a predetermined size (which is determined in units of, e.g., several kilobytes in accordance with a tuple length or computation speed), and each section is managed as a page. As shown in FIG. 52, page management information is stored in the 0th page, relation table information is stored in the 1st page, and information of pages in use is stored in the 2nd page.

The relation table presents locations of a variety of relations in the database.

For example, real data stored in the 9th and 11th pages are sorted based on the attribute (main attribute) of a relation stored in the 5th page in accordance with index page information stored in the 10th page. The index page information represents the correspondences between attribute values and pages.

When data is retrieved using an attribute other than the main attribute, sub data stored in the 21st or 22nd page is obtained for the attribute via the sub index stored in the 20th page. The sub data includes only values of the attribute and the main attribute, and real data is obtained using the attribute value obtained.

As for image data or speech data, when an amount of real data is very large and some bit errors included therein do not cause a problem, these real data may be filed in another inexpensive information storage unit such as optical disk unit 32d. In this case, the real data pages, e.g., the 9th and 11th pages, can store data indicating that the data is stored in unit 32d and storage position information of the real data in unit 32d.

The additional function for the database constituted as described above includes, e.g., an automatic discard function of unnecessary data. In the automatic discard function of unnecessary data, data "discard; YES/NO" and "discard method" are provided as additional information of the relation, and a delete command of each relation is enabled at predetermined intervals.

Note that deletion of the tuple can be performed as follows. For example, in the case of meeting information, it can be determined whether the end time of the meeting is before or after the current time. Therefore, a special function addition is not necessary for deletion of the tuple.

Data preservation is another important function in the additional function. The data preservation function prevents data from being abnormal (disordered or lost) due to a trouble of hardware or power failure. More specifically, the data preservation function can be realized by preparation of backup information or duplication to a magnetic tape.

In this manner, database section 32 classifies a variety of data in units of relations, and manages them in units of pages, so as to provide them for a variety of application systems.

Work environment data acquisition section 25 will be described hereinafter.

Work environment data acquisition section 25 acquires operation history data for the corresponding work station, and performs an operation guide based on this data.

As shown in FIG. 53, section 25 has a command correspondence table representing correspondences between commands corresponding to the functions of the information processing system and corresponding commands of functions of other information systems.

More specifically, assuming that the information processing system is given as A and other information processing systems are given as B, C, D, ..., the command correspondence table shows that commands corresponding to command "DELETE" in system A are "DEL", "ERASE", and "REMOVE".

FIG. 54 shows a schematic arrangement of work environment data acquisition section 25 which analyzes a command input by a user, and executes a predetermined operation and various guidances.

Figure 55:
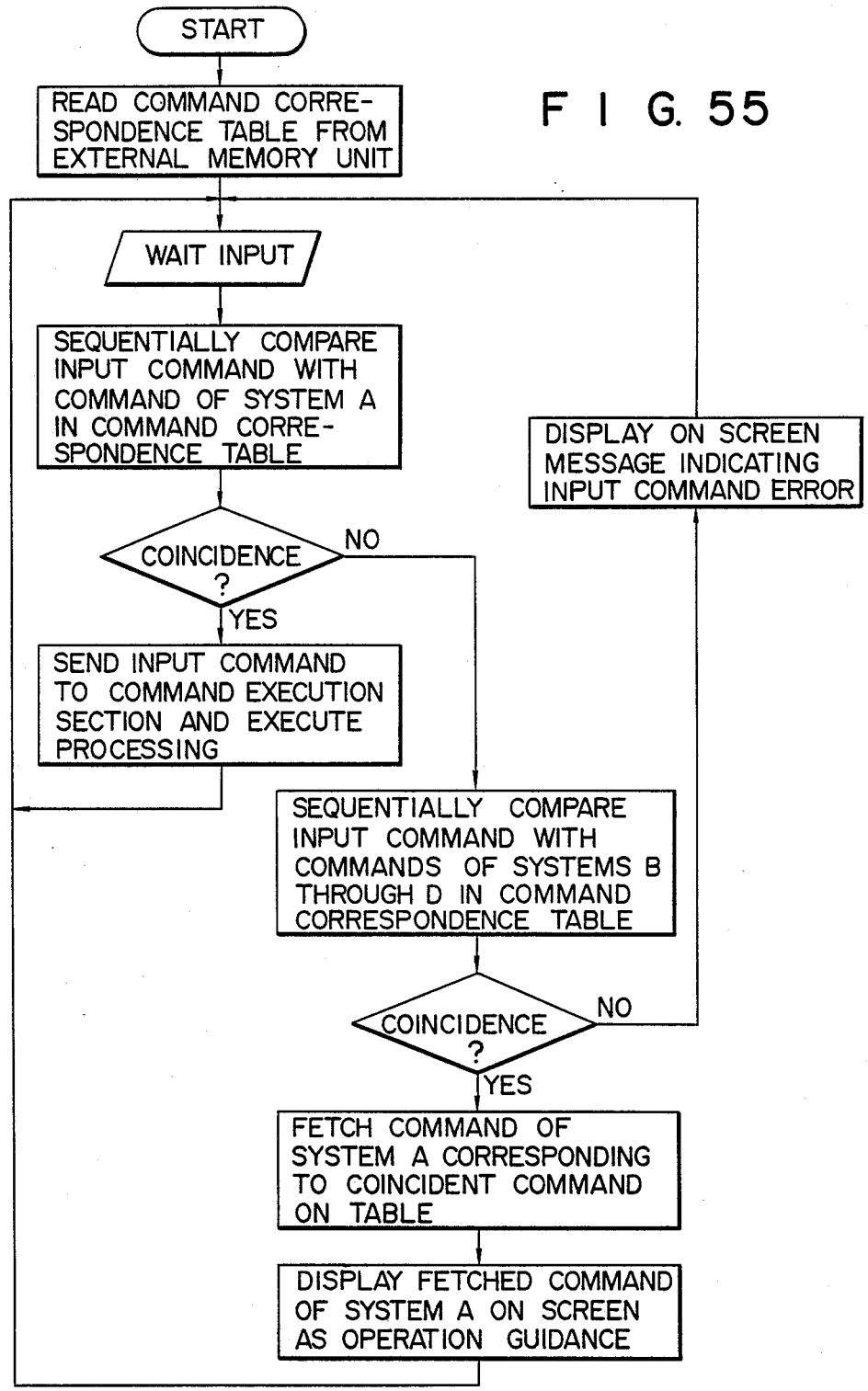
FIGS. 55 through 58 are a flow chart and views for explaining processing in a command section, respectively.

In work environment data acquisition section 25, a command input from command input section 25a is supplied to command analysis section 25b, and is analyzed with reference to command correspondence table 25c. More specifically, it is checked in accordance with the flow shown in FIG. 55 if an input command is registered in command correspondence table 25c. That is, if a command is input, it is first checked if the input command is that of system A. If it is determined that the input command is that of system A, command analysis section 25b supplies the input command to command execution operation based on the command.

If it is determined that the input command does not coincide with that of system A, it is checked if the input command corresponds to those of other systems. If the corresponding command is found, the corresponding command is displayed on screen display section 25e. More specifically, if the input command, e.g., "DEL", corresponds to a command used in another system (e.g., system B), command "DELETE" of system A corresponding thereto is obtained, and is displayed on section 25e as an operation guidance.

If command correspondence table 25c includes no command corresponding to the input command, a command error message is displayed on section 25e.

More specifically, the following processing is performed in response to the command input. Assume that a user who has used systems C and B operates system A (the information processing system of interest). When the user inputs a command to delete data "ABC", in a conventional system, he must find and input command "DELETE" for deleting data in accordance with the instruction manual of system A.

Figure 56:
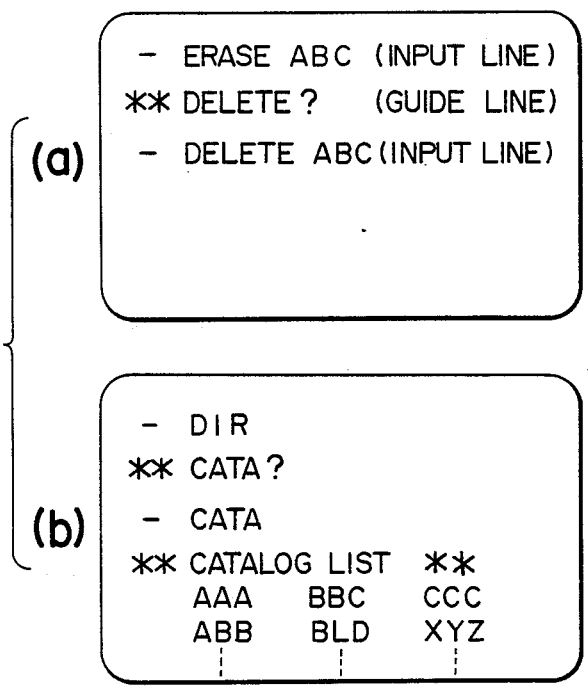

However, in this case, the user inputs data erase command "ERASE ABC" used in system C according to his experience, as shown in FIG. 56(a).

Work environment data acquisition section 25 analyzes the input command, and retrieves command "DELETE" for system A corresponding to input command "ERASE". Then the retrieved command is displayed as a guide. As a result, even when the user operates system A for the first time, he can know that the data delete command is "DELETE", and can input the command in accordance with the guide, thus deleting data.

When command "DIR" in system B is input as shown in FIG. 56(b) in order to display a list of file names, corresponding command "CATA" in system A is retrieved, and is displayed as a guide. As a result, when the user inputs the command "CATA" in accordance with the guide, the list of file names is displayed.

In this manner, the function of work environment data acquisition section 25 can be utilized, so that the user can input a command used in the system which he has operated before and the corresponding command in the system is displayed as a guide. Therefore, the user can operate the system by fully utilizing his past experiences. Thus, he can easily know the commands of the information processing system of interest, and need not refer to an operation manual of the system each time he operates a new system. As a result, a time required for learning the operation of a new system can be greatly shortened.

When a command corresponding to an input command is retrieved and is displayed as a guide, the command may be executed upon reception of YES/NO decision input of the command.

Figure 58:
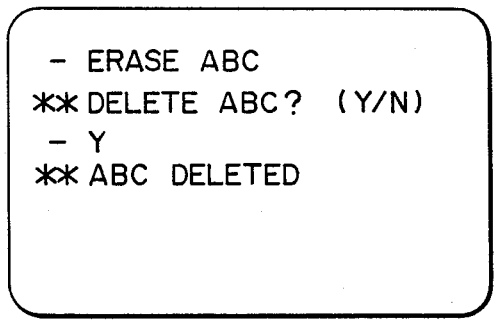
Figure 57:
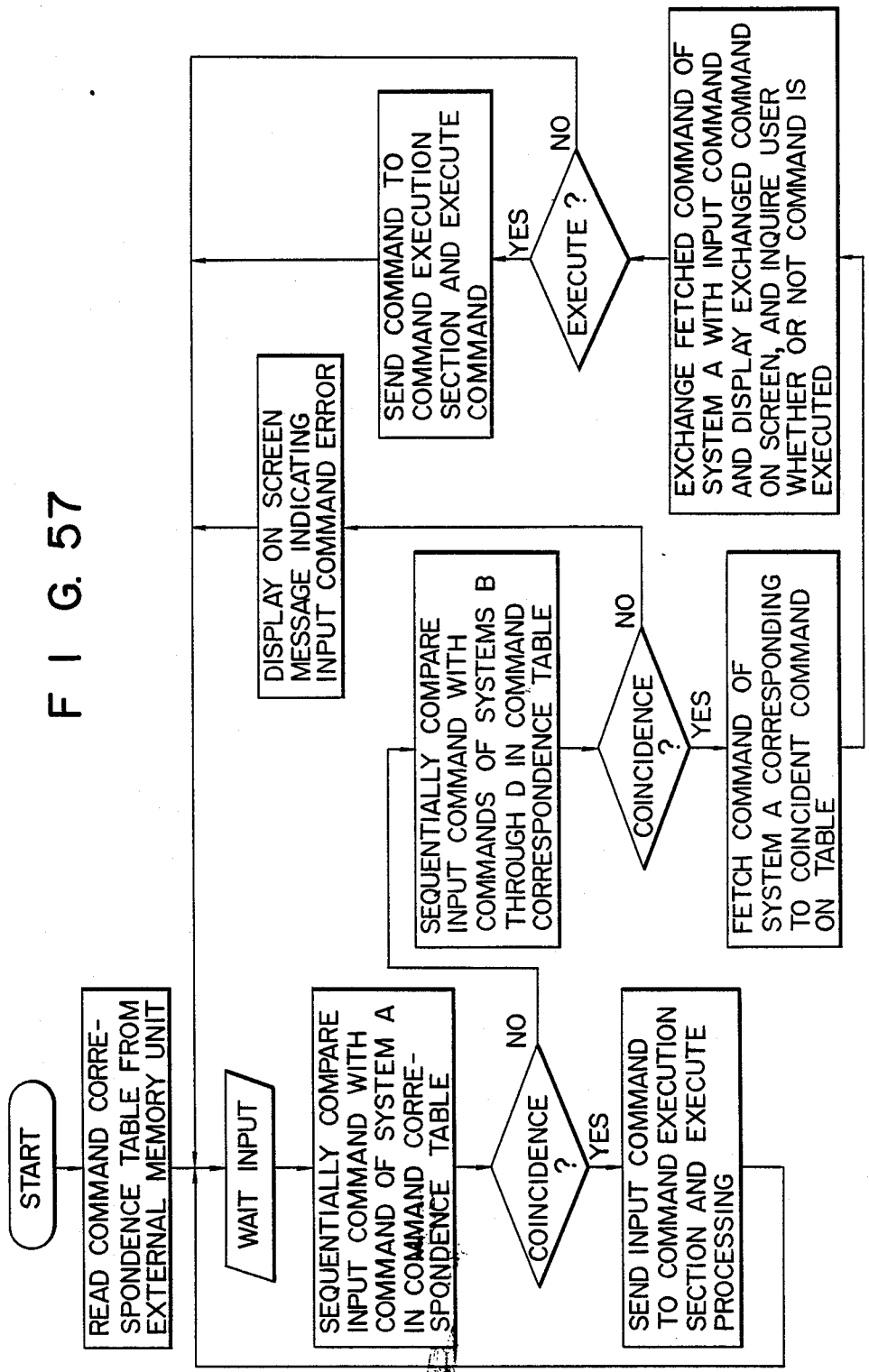

As shown in the flow of FIG. 57 and a display example of FIG. 58, when command "ERASE" in another system is input and corresponding command "DELETE" is obtained, it is inquired if this command is correct. If a positive instruction input (Y) is made, it is determined that the input command indicates "DELETE", and the command is sent to command execution section 25d so as to execute the corresponding processing.

In this manner, the correspondence of the commands is displayed as a guide, and desired processing is executed in accordance with the input command. Therefore, a correct command need not be re-input. More specifically, the input command is automatically converted into the corresponding command, and the corresponding processing is executed. Therefore, operability can be further improved.

Note that the number of corresponding commands is not limited depending on the type of system. The commands need only be stored in command correspondence table 25c to have a predetermined correspondence. In addition, the command is not limited to the above-mentioned character string format.

System skill data acquisition in work environment data acquisition section 25 will be described hereinafter.

Figure 59:
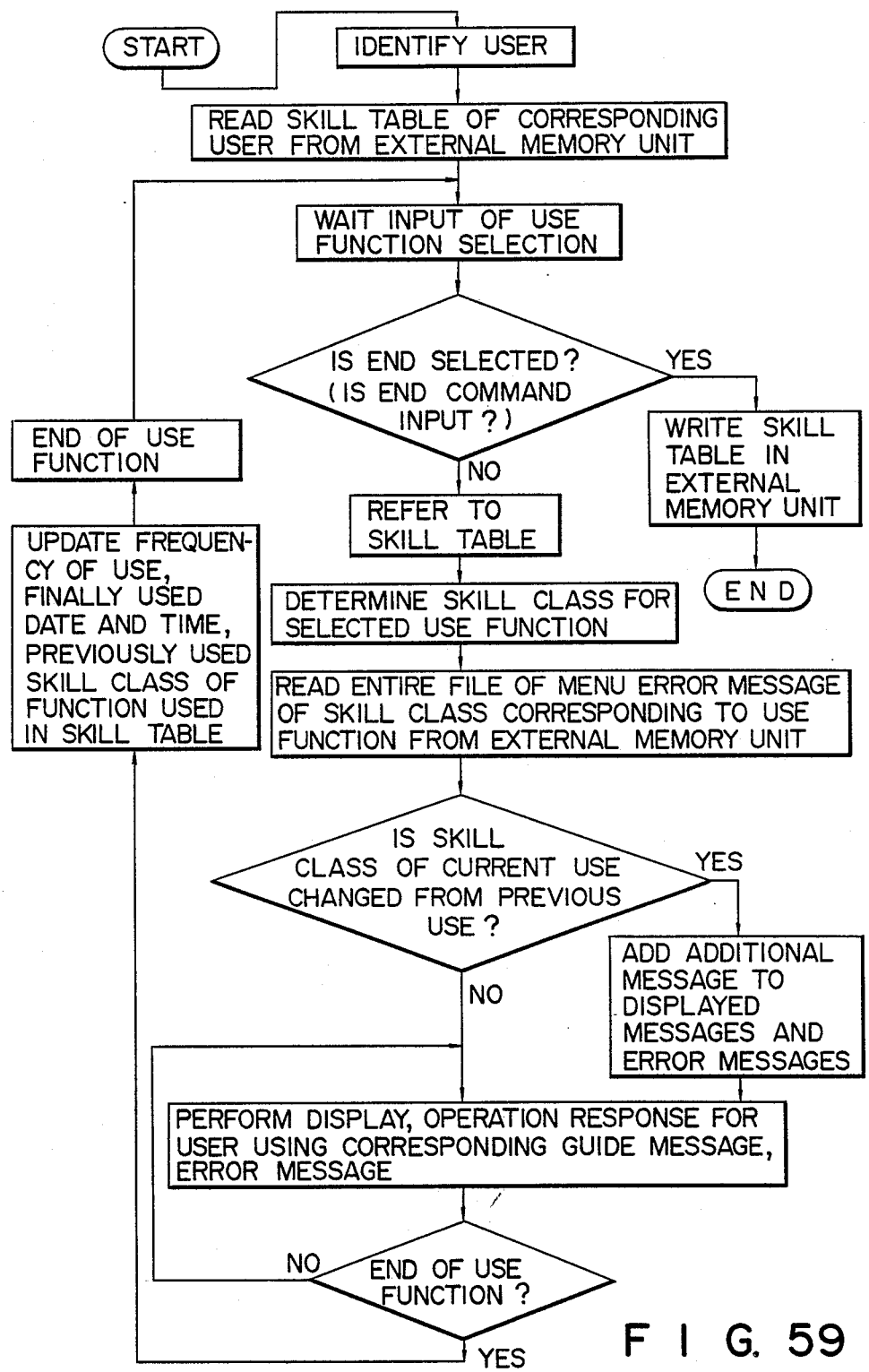
FIG. 59 is a flow chart showing system skill data acquisition processing.

FIG. 59 is a flow chart showing system skill data acquisition processing.

When a user inputs his identification code (user number or password), work environment data acquisition section 25 fetches a skill table corresponding to the identification code from an external storage unit, and sets it therein. The skill table stores data representing degrees of skill of users with respect to various functions of the system, as shown in FIG. 60.

More specifically, the skill table is constituted by a frequency of use, date of last use, a skill class stated by a user for each function, a skill class when he used the corresponding function last time, level of the corresponding function, and the like.

In this case, the level is increased as the corresponding function requires more expert knowledges, and is increased as the function is advanced from the basic function.

The skill table is used for each user, and is stored in the external storage unit. For a user who users the system for the first time, a skill table for the user is created by setting a new identification code, and is stored in the external storage unit.

Figures 61, 62:
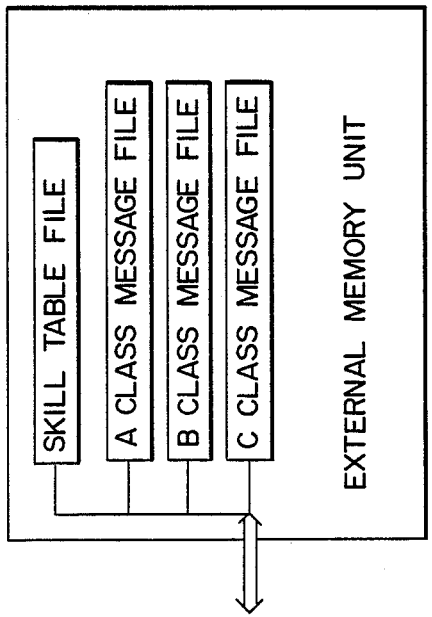

The external storage unit stores messages for functions corresponding to the skill classes, as shown in FIG. 61, in addition to the skill tables described above. As the skill class is lower, a plain message including a background explanation is prepared. As the degree of skill is increased, the message has an advanced content including a simple explanation and a guidance of an expert function.

The skill classes are classified as follows:
A: beginner's class
B: intermediate class
C: advanced class When a skill table corresponding to the input identification code is obtained, a menu for causing the user to select functions is displayed. In response to the menu, the user inputs a number corresponding to the function to be used. The control section determines if the input information is an end signal or a function selection signal. If the input information is the function selection signal, the control section operates as follows.

More specifically, when the function selection signal is input, data of a frequency of use, date of last use, skill class stated by a user, and the like corresponding to the selected function are fetched with reference to the skill table associated with the user. Weighting processing is performed in accordance with these data, and the current skill class is determined.

Assuming that a frequency of use is given as Pi, a date of last use is given as Tc, a skill class stated by a user is given as X1, the skill class previously used is given as X2, a level is given as Pc, and a determination function is given as Fr, the skill class is determined as follows:

$$Fr = K1 + K2(Tc - Te) + G3G1[X1] + K4G2[X2] + K5 \cdot Pc$$

where K1, K2, K3, and K4 constants which are experimentally set to be appropriate values. G1 and G2 in the above equation are respectively represented by:

$$G1 = (ABC)/(Y1Y2Y3)$$

$$G2 = (ABC)/(Z1Z2Z3)$$

where Y1, Y2, Y3, Z1, Z2, and Z3 are evaluation weights for classes A, B, and C. These evaluation weights have the following relation:

$$Y1 < Y2 < Y3, Z1 < Z2 < Z3$$

and are experimentally set to be appropriate values.

G1[X1] means that it takes value Y1 when X1=A, and it takes value Y2 when X2=B. (Tc−Te) represents a time duration obtained by converting the number of days from the date of last use to a current date.

The class is determined in accordance with the value of determination function Fr as follows:

$$Fr < N1 \ldots A \text{ class}$$

$$N1 < Fr < N2 \ldots B \text{ class}$$

$$N2 < Fr \ldots C \text{ class}$$

Note that determination values N1 and N2 are experimentally set to be appropriate values.

After the skill class is determined as described above, guide and error messages corresponding to the determined class and to the designated function are derived from the external storage unit.

Thereafter, the current skill class and the previous skill class stored in the skill table are compared with each other. If the skill class is changed, a message indicating that the degree of skill is changed is added to the guide message.

Four types of messages indicating a change in skill class are prepared, as shown in FIG. 62. The message is selected depending on the change in skill class, and is displayed together with the guide message. The user performs the processing operation in accordance with the messages More specifically, if the skill of a user is determined as a beginner's class (A class) for a function for storing created data in a file, a message shown in FIG. 63 is displayed. If the user erroneously inputs information regardless of the message, an error message shown in FIG. 64 is displayed to make a guidance for the operation of the corresponding function.

If it is determined that the skill of the user is the intermediate class (B class), a message shown in FIG. 65 is displayed. If the user erroneously inputs information regardless of the message, an error message shown in FIG. 66 is displayed to make a guidance for the operation of the corresponding function. Similarly, if it is determined that the skill of the user is the advanced class (C class), a message shown in FIG. 67 is displayed. If information is erroneously input, an error message shown in FIG. 68 is displayed to perform a guidance for the function.

When data is filled in a space of the guide message described above, the control section increments the frequency of use of the skill table of the corresponding user by (+1), and also updates the date of last use and the skill class of last use. The control section urges the user to execute the function. When the function is ended, the menu display operation for selecting functions is performed again.

When the function selection signal is input again, the above-mentioned processing is repeated to execute the function. However, when the end selection signal is input, the created/updated skill table is stored in the skill file together with the identification of the user. Thus, a series of procedures are completed.

In this manner, work environment data acquisition section 25 acquires skill data associated with the system operations, and appropriately guides the operation in accordance with the acquired data.

The basic arrangement and functions of the work station of the present invention have been described.

A processing function as the characteristic feature of the present invention in the work station comprising the above-mentioned basic functions will be described.

The function as the characteristic feature of the present invention, i.e., a function of extracting target information in response to an information inquiry through a telephone and of outputting a response through the telephone is realized by mainly using the speech recognition processing function, the retrieval processing function of database section 32, and graphic recognition function, and the like.

Figure 69:
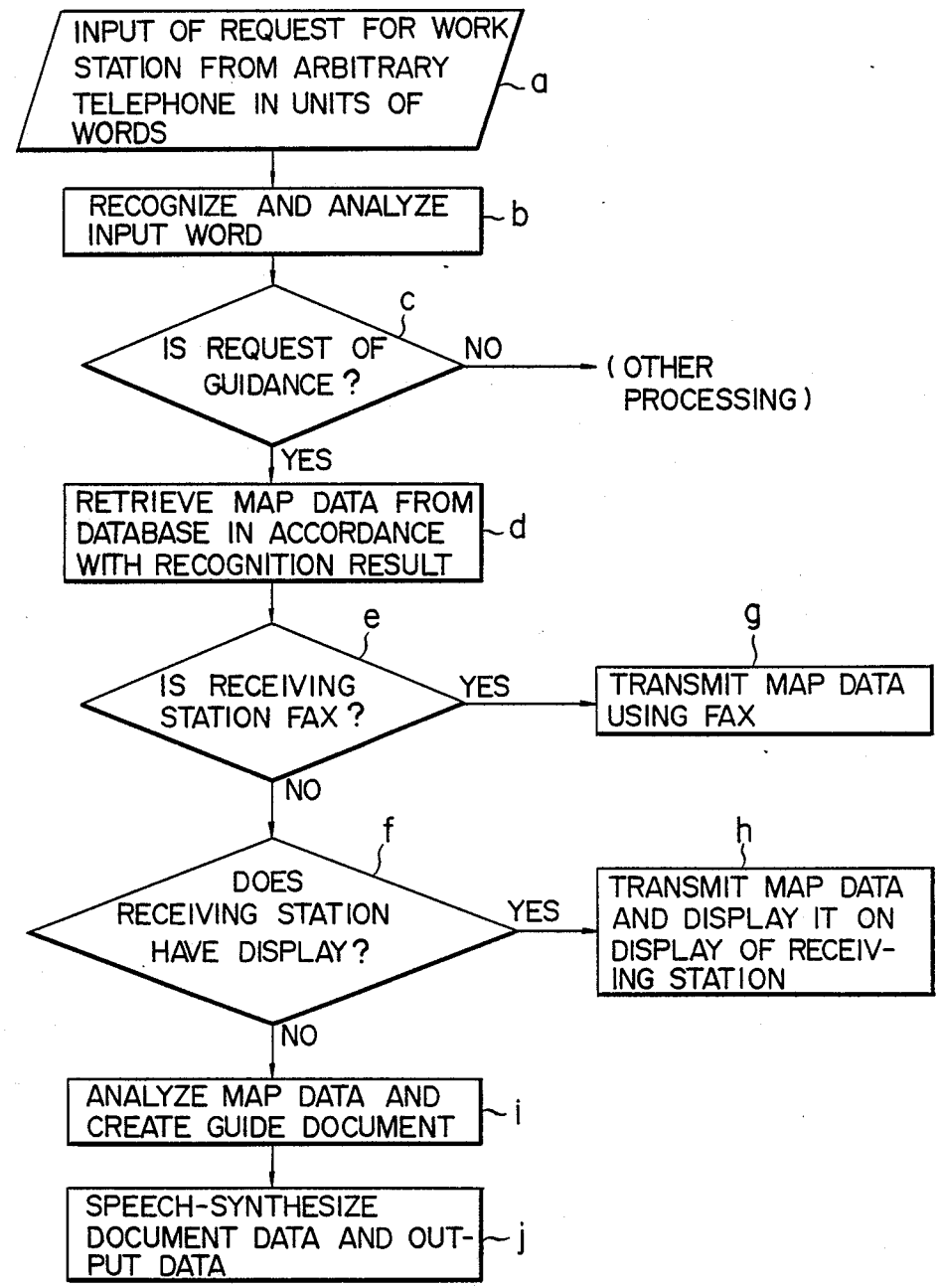
Figure 76:
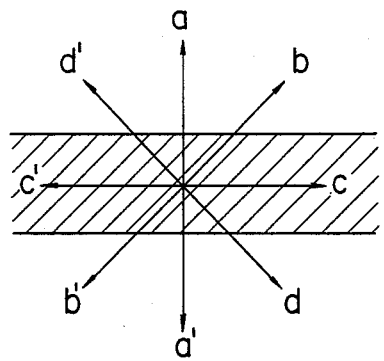
Figure 77:
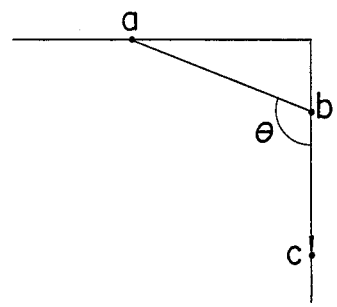

FIG. 69 shows the schematic flow of this processing function. When the work station is accessed by an arbitrary telephone terminal through a telephone line, and a processing request for this station is input by speech through the telephone, this processing function is started (step a). When a route to a specific person's home is inquired, the processing request to the work station is performed by inputting word speech data specifying a request item.

More specifically, word speech data such as "annai", "jitaku", "yamada", "taro", and the like are produced in a predetermined order, thereby inputting request item information to the work station by speech.

These word speech data are fetched by the work station through communication units 12 and 13, and are subjected to speech recognition by speech recognition section 19. The recognition result is analyzed, and the request item of the speech input is recognized. As a result, for example, it is analyzed that "guide information to the home of Mr. Taro Yamada is requested" (step b).

If the guide information to a target is requested, retrieval-extraction processing from the database is started in accordance with the speech input and recognized item information (step d). More specifically, "name attribute", "address book attribute", "home guide map attribute", and the like in "address book relation" are sequentially retrieved in accordance with the speech input item information. More specifically, the above-mentioned request item information is input, "Taro Yamada" is retrieved from "name attribute", and the content of corresponding "home guide map attribute" is extracted. The map number of "guide map to Mr. Taro Yamada's home" is obtained from this content, and graphic (image) data of the guide map (map information) having the corresponding map number, as shown in FIG. 70, is extracted from the database.

Output format selection section 24 determines the type of the telephone terminal which makes a speech input of the above-mentioned request item through the telephone line. In this determination processing, it is determined if the telephone terminal has a function as a FAX terminal (step e). If the terminal has no FAX function, it is then checked if the telephone terminal can use an image display unit such as a liquid crystal display (step f).

As a result of the determination processing, if the telephone terminal generating the inquiry request has the FAX function, the guide map of the corresponding request item retrieved and extracted from the database is transmitted in a FAX format to the telephone terminal through the telephone line (step g).

If the telephone terminal generating the inquiry request does not have the FAX function but has an image display unit such as a liquid-crystal display or can connect the image display unit, the guide map of the request item retrieved and extracted from the database is transmitted in an image format to the telephone terminal through the telephone line. The guide map is then displayed on the display unit of the telephone terminal. In this manner, the requested information is thus provided (step h).

If the telephone terminal generating the inquiry request does not have an image display (output) function like in a normal telephone, the guide map retrieved and extracted from the database is analyzed, as will be described later, and document data representing its content is created (step i). The created document data is speech-synthesized, and the information is provided by outputting a speech message through the telephone line (step j).

The guide map (map information) which is stored in database section 32 and is provided in response to an inquiry by a telephone is represented by line segments indicating roads and various symbols, as shown in FIG. 70. Note that various symbols are given as predetermined graphic patterns representing information serving as landmarks for a target (e.g., police box, hospital, and the like), as shown in FIG. 71.

The guide map represented by the line segments and various symbols is created such that the symbols are independently created (without contacting line segments indicating roads), and road line segments indicating a route are converted to bold line segments. In addition, information indicating a distance between typical feature points (e.g., intersection or inflection point) is written beside a line segment indicating a road.

Since the guide map is created based on the above-mentioned rules, plain guide information of the route can be appropriately presented. As will be described later, creation of a guide message by recognition/analysis processing of the guide map can be facilitated.

The guide message is created from the guide map as follows

FIG. 72 shows an arrangement of a guide map analysis section realized as a part of graphic recognition section 22. This section comprises thinning processing section 22m, segment dividing section 22n, symbol detection section 22p, symbol recognition section 22q, road segment detection section 22r, route detection section 22s, and guide message creating section 22t.

Thinning processing section 22m performs thinning processing of a guide map read the database to convert the line segments indicating those having a line width "1". Upon thinning processing, tracing of the line segments can be facilitated, and an end point, a branch point, and the like can be easily extracted.

Segment dividing section 22n raster-scans the thinned image data of the guide map as described above to obtain a starting point of the line segment, and traces the line segments using the starting point as one feature point, as shown in FIG. 73. In the tracing of the line segments, the priority order of moving direction with respect to an entrance direction to a current point is determined, as shown in FIG. 74, and a change in moving direction is checked while sequentially tracing the line segments, thereby obtaining feature points such as intersections and inflection points. The line segments are sequentially divided at the feature points, and feature information of each segment is extracted. Note that the extracted segment information is stored in a segment table shown in FIG. 75, and is subjected to detection of road segments, as will be described later.

Note that the segment table manages the segment information by sequentially numbering the detected segments, and stores starting point coordinates, end point coordinates, a length, a line width, the number of corners, and link information with other segments, flag information indicating a symbol, character, or a road of each segment.

The line width can be obtained such that the number of black points when the line segment is scanned in its widthwise direction is measured, and the smallest count value is employed as the line width. The corner point can be easily obtained as follows. Three points a, b, and c on the line segment at equal intervals are obtained, and angle $\theta$ defined by straight lines ab and bc formed by these three points is obtained. Then, point b is employed as a corner point candidate when angle $\theta$ is decreased below a predetermined value. The similar processing is repeated while shifting three points a, b, and c, and corner point candidates are compared to finally determine a true corner point.

Road segment detection section 22r detects segments indicating roads from the segment information described above. Route detection section 22s extracts bold segments among the segments and determines them as segments indicating a route.

Symbol detection section 22p detects, e.g., segments forming a closed loop as a symbol mark. Symbol recognition section 22q recognizes the symbol in accordance with the feature of the symbol mark based on corresponding information shown in FIG. 71. In addition, section 22q recognizes the positional relationship between the recognized symbol and the segment indicating the road.

The graphic information of the guide map retrieved and extracted from the database is analyzed by segment division and symbol recognition, thus obtaining a recognition result.

Guide message creating section 22t obtains a route from, e.g., a station as a route guide starting point, to a target (destination) as information of roads represented by bold lines. Simultaneously, a road length and recognition result of symbols present around the road are obtained as landmarks of the route guide. When a guide map shown in FIG. 70 is given, the following guide messages are sequentially created.

(1) Go straight about 20 meters from station
(2) Turn to the left at the end of the road
(3) Go straight about 50 meters, you will see a hospital on your right-hand side, and you will be at a crossing
4) Turn to the right at the crossing
(5) Go straight about 200 meters, you will see a police box on your right-hand side, and you will be at another crossing
(6) Turn to the right at the crossing
(7) Go straight about 150 meters, and you are at the destination
(8) This is the end of message.

The created document data is supplied to speech synthesis section 26, and the character strings are analyzed as described above, thereby synthesizing speech data corresponding to the document data based on the predetermined rules. The synthesized speech data based on the rules is output from communication units 12 and 13 to the telephone terminal from which an inquiry is made through the telephone line.

According to the present invention as described above, inquiry information input by speech through the telephone line is recognized, and a guide map corresponding to the inquiry of a route is retrieved and extracted from the database. If the telephone terminal making the inquiry has an image data communication function, the guide map is transmitted to the telephone terminal in an image format. If the telephone terminal does not have the image communication function, the guide map is analyzed and a guide message representing its content is created. Then, the guide message is speech-synthesized, and is output by speech to the telephone.

Therefore, a route guide to a destination can be responded to a telephone terminal generating an inquiry request in the form of a guide map or a guide message. In addition, the guide map can be output as an image or the guide message can be output as speech in accordance with the type of the telephone terminal making an inquiry, i.e., the presence/absence of the image communication function (e.g., FAX) or the image display function (e.g., display). Thus, a response to the inquiry can be provided in a simple, plain format, and a variety of inquiries under various circumstances can be coped with.

For the work station, the above-mentioned guide messages need not be created in advance and stored in the database in correspondence with guide maps.

Therefore, the memory capacity required for the database can be reduced. In other words, the memory capacity of the database can be effectively utilized to allow storage of other information.

In addition, the guide messages need not be created in advance for guide maps including those for which it is not determined whether a guide message is necessary. Therefore, labor for generating a guide message can be greatly reduced. Only when the guide message is necessary, it is created based on the guide map, thus improving processing efficiency.

Note that the present invention is not limited to the above embodiment. For example, the analysis algorithm of a guide map, and the creation algorithm of a guide message based on the analyzed guide map can be determined depending on the system specifications. In addition, the speech synthesis algorithm may be modified. That is, various changes and modifications made within the spirit and scope of the invention.

What is claimed is:

1. An intelligent work station comprising:
a database for storing map information;
recognizing means for recognizing a word speech input through a telephone line and analyzing the recognition result;
extraction means for accessing said database in accordance with the recognizing result from said analysis means and extracting the map information indicated by the word speech input;
detection means for detecting by referring to a table, in which function conditions of communication are registered, whether or not a communication terminal from which the word speech input is made by means of the telephone line, has image output means;
means for transmitting by way of the telephone line, image data of the map information extracted by said extraction means, when said detection means detects that the communication terminal has said image output means;
document data creating means for analyzing the map information extracted by said extraction means and creating document data, in accordance with the analysis result, which represents a content of the map which corresponds to said map information, when said detection means detects that the communication terminal does not have said image output means; and
output means for speech-synthesizing the document data created by said document data creating means and outputting the resultant data to the communication terminal via the telephone line. terminal via the telephone line.

2. An intelligent work station according to claim 1, wherein the map information is a guide map for a target, and is classified in units of targets and stored in said data base.

3. An intelligent work station according to claim 1, wherein the word speech input is a route inquiry from a nearest station to a destination.

4. An intelligent work station according to claim 1, wherein said image output means comprises a facsimile device.

5. An intelligent work station according to claim 1, wherein the communication terminal is a telephone terminal having a facsimile function.

6. An intelligent work station according to claim 1, further comprising an image input unit for inputting a variety of image information.

7. An intelligent work station according to claim 1, further comprising a coordinate position input unit for inputting designated coordinate position information.

8. An intelligent work station according to claim 1, further comprising a microphone for inputting speech information.

9. An intelligent work station according to claim 1, further comprising a keyboard for inputting characters, symbols, and control codes.

10. An intelligent work station according to claim 1, further comprising an IC card for exchanging information with said intelligent work station.

11. An intelligent work station according to claim 1, further comprising a loudspeaker for outputting speech information.

12. An intelligent work station according to claim 1, further comprising a display section comprising any of a CRT display, a liquid-crystal display, and a plasma display, for displaying characters, figures, and images.

13. An intelligent work station according to claim 1, further comprising an image output unit comprising any of a facsimile unit, a printer, and a color printer.

14. An intelligent work station according to claim 1, further comprising a communication unit for performing information communication with a telephone, a terminal device, and other intelligent work stations.

15. An intelligent work station according to claim 14, wherein a plurality of said communication units are arranged, and said work station further comprises a communication switching unit for switching said plurality of communication units.

16. An intelligent work station according to claim 1, further comprising encryption processing means for encrypting the map information.

17. An intelligent work station according to claim 1, further comprising speech collating means for determining whether or not the word speech input is a specific speech input.

18. An intelligent work station according to claim 6, further comprising image collating means for determining whether or not image information input by said image input unit is a specific image.

19. An intelligent work station according to claim 1, wherein said recognizing means comprises speech analysis means for extracting a feature of a speech input, and analyzing this feature of the speech input.

20. An intelligent work station according to claim 1, further comprising an output format selection section for selecting whether the map information should be transmitted by way of said image data transmitting means or said document data output means.

21. An intelligent work station according to claim 1, further comprising a work environment data acquisition section for acquiring and inputting information of a functional condition of said intelligent work station and a corresponding work environment in an office.

22. An intelligent work station according to claim 1, further comprising image synthesis/editing means for synthesizing and editing a plurality of image information pieces.

23. An intelligent work station according to claim 1, further comprising a graphic synthesis/editing section for synthesizing and editing a variety of graphic data.

24. An intelligent work station according to claim 1, further comprising means for compressionencoding speech data and expansion-decoding the compressed speech data.

25. An intelligent work station according to claim 16, wherein said encryption processing means comprises an encrypting section for encrypting an input communication text in accordance with an encryption key, a decrypting section for decrypting an input encrypted text in accordance with the encryption key, a private key file section for storing private keys, a public key file section for storing public keys, and a recording/updating section for recording and updating the private and public keys.

26. An intelligent work station according to claim 25, wherein the private keys are known by an intelligent work station which incorporates said encryption processing means, and are kept secret to other intelligent work stations.

27. An intelligent work station according to claim 25, wherein the public keys are paired with the private keys which are set for said intelligent work station, and the paired keys are open to other intelligent work stations.

28. An intelligent work station according to claim 25, wherein said encrypting section comprises an RSA processing section, and a cryptology type adding section, and when a communication text is encrypted to be transmitted, the communication text is encrypted using a public key of a destination intelligent work station, information indicating a type of cryptology is added to the encrypted text to create communication information, and the communication information is transmitted.

29. An intelligent work station according to claim 25, wherein said RSA processing section comprises a block dividing section for dividing an input signal train into blocks each having a predetermined length, a power/remainder calculating section for calculating signal train Ni ($=Mj^k$ (mod n)) using said encryption key for each block, and a block coupling section for coupling the divided blocks.

30. An intelligent work station according to claim 25, wherein said intelligent work station encrypts communication information in accordance with a given public key, and the encrypted communication text is decrypted by an intelligent work station which has a private key paired with the given public key.

31. An intelligent work station according to claim 18, wherein said image collating means performs an arithmetic operation $$D = \sum_i |X_i - Y_i|$$

where $X_i$ is the feature data of an input image (i indicates a type of feature), and Yi is the feature data of a registered image, and Y specifies the data which has the smallest calculation result D as its image data.

32. An intelligent work station according to claim 1, wherein said speech input recognizing means comprises a filter bank for extracting a change in spectrum of an input speech signal, and a gloss filter for extracting acoustic features of the input speech signal.

33. An intelligent work station according to claim 21, wherein said work environment data acquisition section comprises a command analyzing section for analyzing whether an input command is a command used in said intelligent work station or not, and a command correspondence table section for storing a correspondence table between the commands which are used in other systems and having functions identical to those of said intelligent work station, and commands used in said intelligent work station, and when a command which is not used in said intelligent work station is input, said command analyzing section refers to said command correspondence table section so as to convert the input command into a corresponding command used in said intelligent work station.

34. An intelligent work station according to claim 21, wherein said work environment data acquisition section prestores degrees of skill in units of users of said intelligent work station, and presents different messages to users in accordance with the degree of skill of the users.

* * * * *